US011946842B1

(12) United States Patent
Woolsey et al.

(10) Patent No.: US 11,946,842 B1
(45) Date of Patent: *Apr. 2, 2024

(54) THERMOPHORETIC PARTICLE CONCENTRATOR

(71) Applicant: Aerodyne Microsystems Inc., San Jose, CA (US)

(72) Inventors: David Woolsey, Berkeley, CA (US); David William Burns, San Jose, CA (US)

(*) Notice: Subject to any disclaimer, the term of this patent is extended or adjusted under 35 U.S.C. 154(b) by 359 days.

This patent is subject to a terminal disclaimer.

(21) Appl. No.: 17/360,645

(22) Filed: Jun. 28, 2021

Related U.S. Application Data

(63) Continuation of application No. 16/189,836, filed on Nov. 13, 2018, now Pat. No. 11,047,777.

(Continued)

(51) Int. Cl.
*G01N 1/40* (2006.01)
*B04B 5/08* (2006.01)
(Continued)

(52) U.S. Cl.
CPC ............ *G01N 1/4022* (2013.01); *B04B 5/08* (2013.01); *B04B 15/02* (2013.01); *G01N 1/2247* (2013.01); *G01N 15/02* (2013.01); *G01N 15/0272* (2013.01); *G01N 15/10* (2013.01); *B04B 2013/006* (2013.01); *G01N 2001/002* (2013.01);
(Continued)

(58) Field of Classification Search
CPC ..... B04B 15/02; B04B 2013/006; B04B 5/08; G01N 1/2247; G01N 1/2273; G01N 1/4022; G01N 15/02; G01N 15/0272; G01N 15/0606; G01N 15/10; G01N 2001/002;
(Continued)

(56) References Cited

U.S. PATENT DOCUMENTS 5,763,360 A   6/1998 Gundel et al.
6,226,852 B1  5/2001 Gundel et al.
(Continued)

FOREIGN PATENT DOCUMENTS

GB   2319191 A  *  5/1998  ............. B01D 43/00

OTHER PUBLICATIONS

Justin Phelps Black "MEMS-Based System for Particle Exposure Assessment Using Thin-Film Bulk Acoustic Wave Resonators and IR/UV Optical Discrimination" Technical Report No. UCB/EECS-2006-193 published Dec. 22, 2006, University of California at Berkeley, downloaded on Nov. 12, 2018 from http://www2.eecs.berkeley.edu/Pubs/TechRpts/2006/EECS-2006-193.pdf.

*Primary Examiner* — Jennifer Wecker
(74) *Attorney, Agent, or Firm* — Stephen E. Zweig

(57) ABSTRACT

A system for concentrating particles in an air stream includes an air channel having a first open end and a second open end. The air channel may be enclosed by a channel wall extending from at least the first open to the second open end. Two or more heater elements may be positioned between the first open end and the second open end. The heater elements may be positioned near a periphery of the air channel and cooperatively configured to force particles in the air stream away from the periphery and towards an interior region of the air channel. Particles in the air stream may be thermophoretically forced towards the interior region of the air channel when the heater elements are heated and thermal gradients emanating from the heater elements are generated.

20 Claims, 29 Drawing Sheets

Related U.S. Application Data

(60) Provisional application No. 62/586,134, filed on Nov. 14, 2017, provisional application No. 62/586,143, filed on Nov. 14, 2017, provisional application No. 62/586,130, filed on Nov. 14, 2017, provisional application No. 62/586,141, filed on Nov. 14, 2017, provisional application No. 62/586,148, filed on Nov. 14, 2017.

(51) Int. Cl.
| | |
|---|---|
| *B04B 13/00* | (2006.01) |
| *B04B 15/02* | (2006.01) |
| *G01N 1/00* | (2006.01) |
| *G01N 1/22* | (2006.01) |
| *G01N 15/00* | (2006.01) |
| *G01N 15/02* | (2006.01) |
| *G01N 15/10* | (2006.01) |
| *G01N 15/06* | (2024.01) |

(52) U.S. Cl.
CPC ... *G01N 1/2273* (2013.01); *G01N 2015/0046* (2013.01); *G01N 2015/0288* (2013.01); *G01N 15/0606* (2013.01); *G01N 2015/1022* (2024.01)

(58) Field of Classification Search
CPC ... G01N 2015/0046; G01N 2015/0288; G01N 2015/105
See application file for complete search history.

(56) References Cited

U.S. PATENT DOCUMENTS

| | | |
|---|---|---|
| 6,780,818 B2 | 8/2004 | Gundel et al. |
| 7,168,292 B2 | 1/2007 | Gundel et al. |
| 8,806,915 B2 | 8/2014 | White et al. |
| 2013/0036793 A1 | 2/2013 | White et al. |
| 2018/0099228 A1 | 4/2018 | Paprotny et al. |
| 2019/0293538 A1 | 9/2019 | Papronty et al. |

* cited by examiner

US 11,946,842 B1

THERMOPHORETIC PARTICLE CONCENTRATOR

CROSS-REFERENCE TO RELATED APPLICATIONS

This patent application is a continuation of U.S. patent application Ser. No. 16/189,836, filed Nov. 13, 2018; Application Ser. No. 16/189,836 claimed the priority benefit of U.S. Provisional Patent Applications 62/586,130; 62/586,134; 62/586,141; 62/586,143; and 62/586,148; the entire contents of all of these applications are incorporated herein by reference.

TECHNICAL FIELD

This patent disclosure relates generally to the field of particulate-matter detection and more specifically to air-quality sensors and to systems and methods for determining airborne-particle content.

BACKGROUND

The presence of airborne and other gas-borne particulate matter (PM), alternatively referred to as aerosol particles, can contribute to poor air quality and potentially adverse health effects. These particles can penetrate into human and animal lungs, contributing to lung disease, heart disease, cancer and other illnesses. Such particles may be produced by many sources, including industrial and agricultural processes, fossil-fuel combustion in power plants and vehicles, fires, smoking, and other natural and manmade causes.

Airborne particles with a diameter of 2.5 microns or less (often termed PM2.5) tend to be particularly problematic. These finer sized particulates can remain suspended in the air for long periods of time and can penetrate deep into the lung alveoli. Airborne particles under 0.1 microns in diameter can pass through the lungs and enter the body, causing damage to other organs. Particles of intermediate sizes, such as between 2.5 and 10 microns (often termed PM10), although not as potentially toxic as the smaller PM2.5 particles, are also medically problematic because these can also penetrate into at least the outer portions of the lungs. In contrast, the larger sized particles, such as particles over 10 microns in diameter, tend to be less problematic from a health perspective. This is because such larger particles do not penetrate as deeply into the lungs and tend to settle out of the air relatively quickly. The impact of nanoparticles in the range of 0.01 microns to 0.1 microns is relatively unknown and is an active area of study, although significant adverse health impacts are suspected.

Monitoring and controlling airborne particulate matter is of intense interest due to potentially adverse health and environmental effects. Various health, legal, government, scientific, industrial and commercial entities have considerable interest in methods of monitoring airborne and other gas-borne particulate matter. Methods that can further distinguish between various sizes of particulate material are particularly valued. Current systems for monitoring particulate matter tend to be relatively bulky, complex and expensive, which generally render them unsuitable for mass-market use.

Airborne particles often constitute a tiny fraction of air volume. Methods, systems, and devices for concentrating the particles before particle detection and property determinations can provide benefits including reductions in the size, complexity and cost of such systems, improved device performance and speed, and lower minimum detectability limits.

BRIEF SUMMARY OF THE INVENTION

In some embodiments, the invention may be a system for concentrating particles in an air stream includes an air channel having a first open end and a second open end. The air channel may be enclosed by a channel wall extending from at least the first open end to the second open end. Two or more heater elements may be positioned between the first open end and the second open end. The heater elements may be positioned near a periphery of the air channel and cooperatively configured to force particles in the air stream away from the periphery and towards an interior region of the air channel. Particles in the air stream may be thermophoretically forced towards the interior region of the air channel when the heater elements are heated and thermal gradients emanating from the heater elements are generated.

In some embodiments, the air channel may be circular and the heater elements positioned along a circumference of the channel wall in a direction substantially perpendicular to the air stream. The heater elements may be continuous and extend around the channel wall. Alternatively, the heater elements may extend along the channel wall in a direction substantially parallel to the air stream.

In some embodiments, the cross-sectional geometry of the air channel may be rectangular and at least two heater elements may be positioned on two opposing sides of the channel wall. In various implementations, the heater elements may extend along the channel wall in a direction substantially parallel to the air stream or extend along the channel wall in a direction substantially perpendicular to the air stream. At least one heater segment of a heater element may extend along the channel wall in a direction that is angled with respect to the air stream. The heater elements may include one or more heater wires, thin-film heater elements, multi-tapped heater elements, wall-mounted thin-film heater elements, stub heaters, heat spreaders, or banded heater elements that are thermally coupled to the air stream in the air channel. The first open end and the second open end of the air channel may have a width and a height between about 30 microns and about 50 millimeters. One or more pairs of expansion stages and compression stages may be positioned between the first open end and the second open end of the air channel.

In some embodiments, the invention may employ a system for concentrating particles that includes devices or methods for moving air through the air channel. The system may include a particle detector coupled to the air channel, and may also include a controller configured to apply power to the heater elements.

In some embodiments, the invention may comprise a thermophoretic particle concentrator that includes at least one pair of thermophoretic heater elements positioned near a periphery of an air channel. The thermophoretic heater elements may be configured to thermophoretically force airborne particles in the air channel away from the periphery and towards an interior region of the air channel.

In some embodiments, the invention may comprise a method of concentrating particles in an air stream that includes applying power to at least one pair of heater elements positioned near a periphery of an air channel encompassing at least a portion of the air stream, generating a thermal gradient within the air channel, and forcing particles in the air stream away from the periphery and towards an interior region of the air channel with thermophoretic force generated by the thermal gradient.

In some embodiments, the method of concentrating particles may further include drawing air through the air channel to generate the air stream, detecting particles concentrated in the air stream, and analyzing the detected particles.

Figure 1:
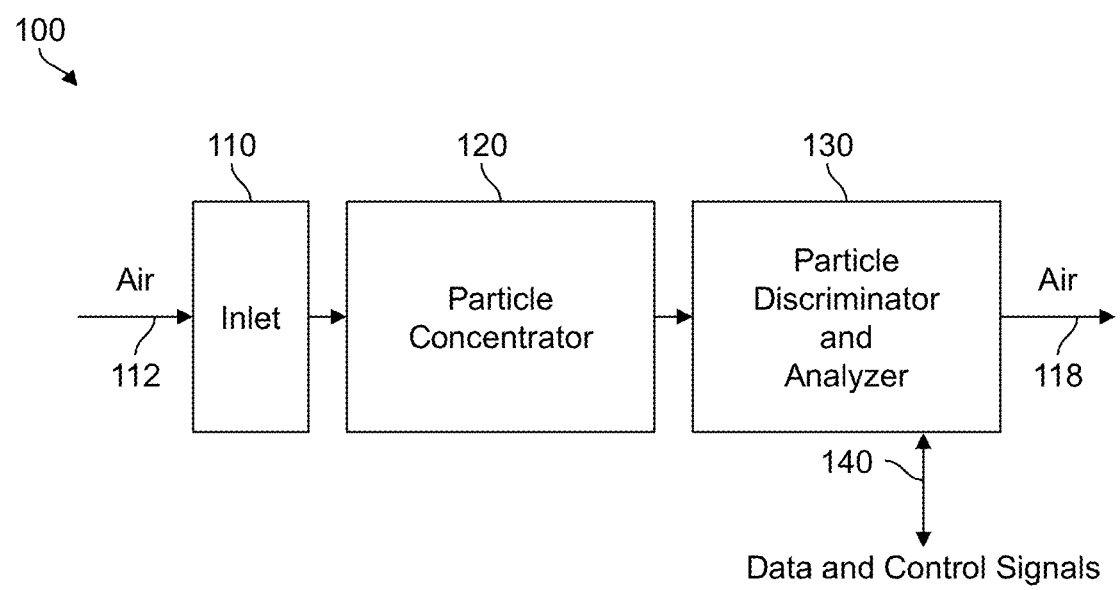
FIG. 1 shows a simplified block diagram of a system for analyzing particles in an air stream.
Figure 2:
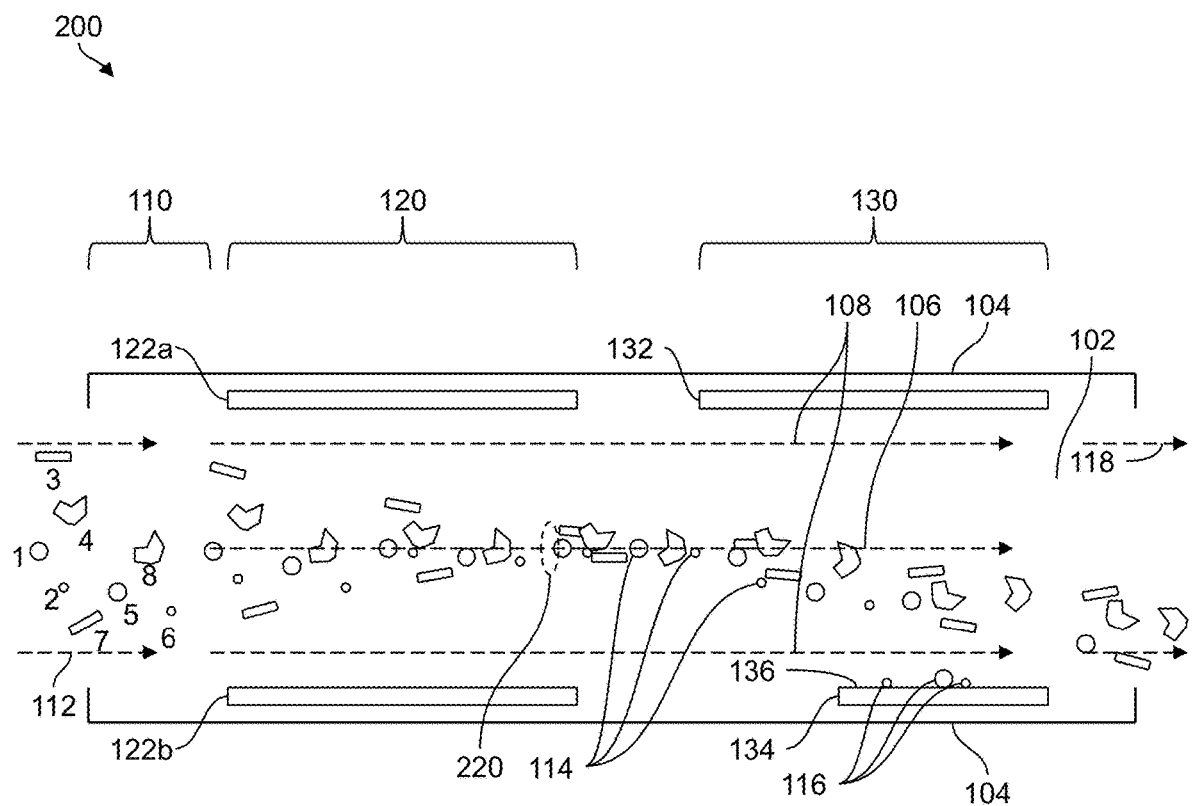
FIG. 2 illustrates a method of analyzing particles traversing a system for analyzing particles in an air stream.
Figure 3:
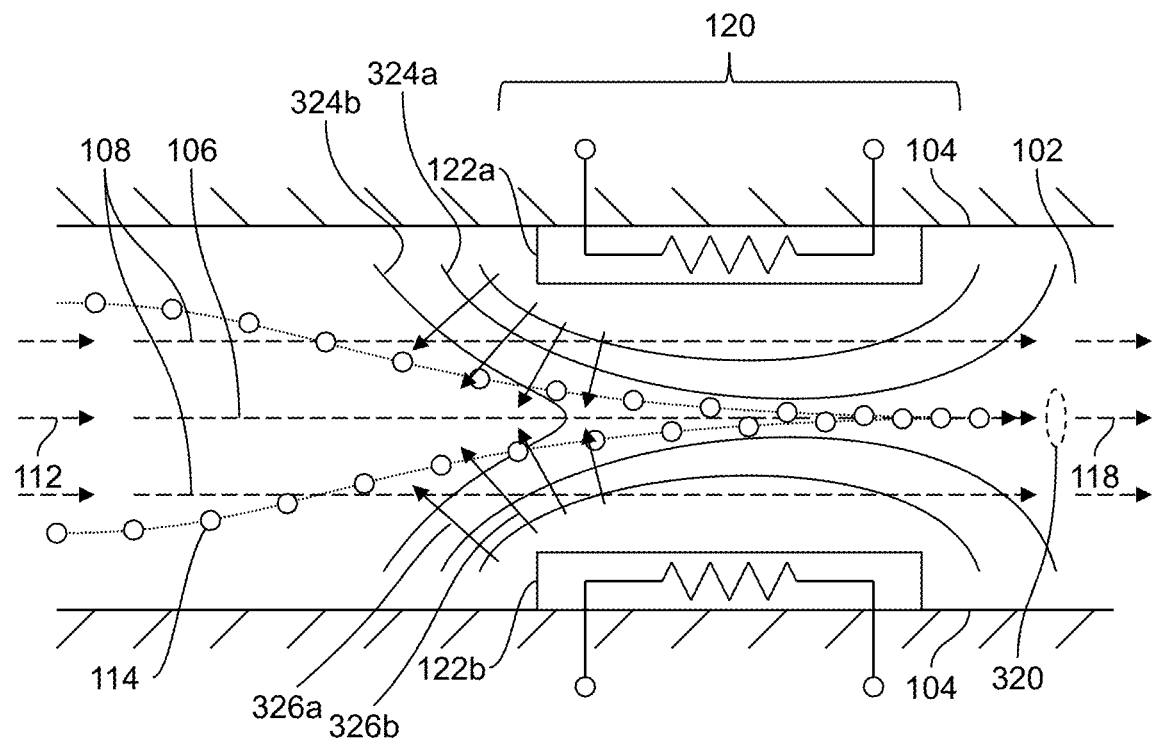
FIG. 3 illustrates elements and operation of a thermophoretic particle concentrator.

FIGS. 10A-10C illustrate perspective and cross-sectional views of a resonant-based particle detector.

FIGS. 11A-11B illustrate operation of a system for analyzing particles in an air stream.

FIGS. 12A-12B illustrate a top view and a side view of a system for analyzing particles in an air stream.

FIGS. 13A-13B illustrate a perspective view and a side view of a system for analyzing particles.

FIGS. 14A-14D illustrate top and side views of a system with a rectangular air channel for analyzing particles in an air stream and operation thereof.

FIGS. 15A-15D illustrate top and side views of a system with an expanding air channel for analyzing particles in an air stream and operation thereof.

FIG. 16 illustrates a top view of a system for analyzing particles in an air stream including a centrifugal particle separator stage.

FIGS. 17A-17B show a side view and an axial view of a thermophoretic particle concentrator having a circular cross-sectional geometry.

FIGS. 18A-18B show a side view and an axial view of a thermophoretic particle concentrator having a circular cross-sectional geometry with heater elements extending in the direction of the air stream.

FIGS. 19A-19B show a side view and an axial view of a system for analyzing particles with a thermophoretic particle concentrator having a circular cross-sectional geometry and individually addressable heater elements positioned along the outer perimeter and length of the particle concentrator.

FIGS. 20A-20B show a side view and an axial view of a thermophoretic particle concentrator having a circular cross-sectional geometry with heater elements extending around the circumference of the tubular particle concentrator.

FIGS. 21A-21B show a top view and a side view of a thermophoretic particle concentrator having a rectangular cross-sectional geometry.

FIGS. 22A-22B illustrate top and side views of a thermophoretic particle concentrator having a rectangular air channel with smoothly tapered heater elements for concentrating particles in an air stream.

FIGS. 23A-23B illustrate top and side views of a thermophoretic particle concentrator having a rectangular air channel with varying cross-sectional geometry including an expansion stage and a compression stage for mechanically and thermophoretically concentrating particles in an air stream.

FIGS. 24A-24B illustrate top and side views of a multi-stage thermophoretic particle concentrator having multiple pairs of expansion and compression stages for concentrating particles in an air stream.

FIG. 25 illustrates a block diagram of a system for analyzing particles in an air stream.

FIG. 26 shows a block diagram of a method for concentrating particles in an air stream and for analyzing particles in the air stream.

DETAILED DESCRIPTION OF THE INVENTION

The techniques, methods, devices, and systems disclosed herein may result in smaller, simpler and lower cost airborne particle detection and monitoring devices that allow mass-market use in homes, buildings, workplace environments, industrial facilities, indoor and outdoor environments, and personal air-quality monitors. Improved airborne particle detection systems and methods may be used in a variety of devices including cellular phones, smartphones, laptop and tablet computers, thermostats, voice-activated tabletop monitors, wearable devices such as watches and personal health monitors, air monitors for green buildings and home-automation systems, vehicle cabin monitoring, smoke detectors and protective devices such as face masks and eyeglasses, among other applications.

Improved air particle monitoring devices can be facilitated by systems and methods configured to use thermophoretic forces. Such systems and methods can produce various effects useful for such improved devices by employing suitable thermal gradients. These effects may include concentrating and focusing particulate material, fractionating particulate material according to size, and directing various sizes of particulate material onto one or more suitable particle sensors such as resonant-based MEMS sensors or other devices in a controlled manner.

Thermophoretic force generally refers to the force that may be exerted on small particles such as micron and sub-micron sized particles that are suspended in a gas or fluid media in the presence of thermal gradients. Absent thermal gradients (also referred to as "temperature gradients" or "heat gradients"), suspended particles experience normal random Brownian motion. In the presence of thermal gradients, more energetic molecules of the gas or fluid media may impact one side of the particle relative to the other side of the particle, producing a net force on the particle that varies as a function of the particle diameter, temperature gradient, gas pressure, particle temperature and other variables such as the thermal conductivity and heat capacity of the particle. This thermophoretic force can in turn impart a thermophoretic velocity to such particles that varies as a function of the thermal gradient, gas viscosity, gas density and the size and composition of the particles. The thermophoretic force may be used to concentrate particles in an interior region of an air stream and to selectively deflect the particles towards suitable particle detectors for detection and analysis.

Particle concentrators based on thermophoretic forces allow the manipulation, concentration, focusing and lensing of airborne particles for detection purposes. Air or other gas samples comprising airborne particles moving in a downstream direction through an air channel enclosing an air stream are obtained. The distribution of the airborne particles in the air stream may be altered by applying a controlled thermophoretic thermal gradient to force the particles towards an interior region of the air stream. The resulting thermophoretic force on the particles can force particles away from the periphery and towards the interior of the air channel to form a concentrated beam of particles that may then be used for more effective particle detection, discrimination and analysis.

While the embodiments disclosed herein generally refer to systems and methods for analyzing particles in an air stream, "air", although encompassing normal earth atmospheric air, can be any type of gas or fluid traversing the air channel. Particles in the air stream generally refer to micron or sub-micron sized particles with a plurality of particle sizes and composition that are suspended in the air stream and are generally distinct from the smaller gas molecules or atoms comprising the carrier gas. A micron (also referred to as "μm") is a unit of length equal to one micrometer or one-millionth of a meter.

Similarly numbered elements in the various figures below apply to similar elements. While the figures are intended to be illustrative, dimensions and features of various elements shown in the figures are not always drawn to scale for clarity.

FIG. 1 shows a simplified block diagram of a system 100 for analyzing particles in an air stream. System 100 includes an inlet 110, a particle concentrator 120 and a particle discriminator 130. A set of data and control signals 140 may be used for communicating, sending and receiving data, and controlling system 100. Inlet air stream 112 may include particulate matter that may be concentrated by particle concentrator 120 and then deflected, collected, detected and analyzed by particle discriminator 130 and associated analytical components. Outlet air stream 118 may include air drawn from the inlet 110 absent particles collected by particle discriminator 130.

In some implementations, system 100 may be wired or wirelessly coupled to a cell phone, smartphone, laptop, or other types of computerized devices to enable one or more processors within the system 100 or computerized device to process the data from system 100 and produce temporal and spatial (if multiple such systems are used) measurements of particulate matter content. In some implementations, system 100 may be communicatively coupled to one or more processors in a data center or a cloud computing environment to perform data processing of the particulate matter data and to provide results of particulate matter data procured from system 100.

FIG. 2 illustrates a method of analyzing particles 114 traversing a system 200 for analyzing particles in an air stream. Particles 114 in the inlet air stream 112 passing through the inlet 110 are drawn through an air channel 102 (also referred to as a "flow channel") that is encompassed by one or more channel walls 104. Without any focusing or concentration, particles 114 generally follow an air stream 106 (also referred to as a "flow stream") in the air channel 102 along one or more streamlines 108. Particles deflected by applied forces such as thermophoretic force or gravitational force may be deflected away from a particular streamline 108 in the direction of the applied force.

Airborne particles 114 may have different sizes and shapes and comprise different materials or aggregates of various materials. Various types of airborne particles 114 at the inlet air stream 112 are depicted and labeled 1 through 8, indicating larger spherical particles 1 and 5, smaller spherical particles 2 and 6, fibrous particles 3 and 7, and fractured particles 4 and 8. As these particles 114 traverse the air channel 102, thermophoretic forces from heater elements 122*a*, 122*b* (also referred to as "heating elements" or "focusing heaters") in the particle concentrator 120 may force particles 114 away from a periphery of the air channel 102 near the channel walls 104 and towards an interior region 220 of the air channel 102 that may be at or near the geometrical center of the air channel 102. Thermophoretic particle concentrator heater elements 122*a*, 122*b* may be used to focus incoming particles 114 into a tighter beam to facilitate analysis. Particles 114 concentrated in an interior region 220 of air channel 102 may progress towards the particle discriminator 130 along one or more streamlines 108.

Particle discriminator 130 may include one or more heater elements 132 (also referred to as a "precipitation heater" or a "deflection heater") to deflect and collect particles on a wall 104 or particle detector 134 opposite the heater element 132. Particles 114 may be deflected by thermal gradients generated by the thermophoretic particle discriminator heater element 132 and directed towards a particle detector 134 near the wall 104 where particles in a selected particle size range may be collected on a surface 136 of the particle detector 134. The collected particles 116 may cause a shift in a resonant frequency of the particle detector 134, which may be calibrated to determine the amount of mass collected on the surface 136. Fractionation, collection, detection and analysis of particles 114 in a particular size range depend in part on size-dependent and composition-dependent thermophoretic forces and an initial well-collimated and pre-focused stream of incoming particles 114. Uncollected particles may continue down the air channel 102 along one or more streamlines 108 and exit via the outlet air stream 118.

FIG. 3 illustrates elements and operation of a thermophoretic particle concentrator 120. Thermophoretic particle concentrator 120 may include at least one pair of thermophoretic particle concentrator heater elements 122*a*, 122*b* positioned near a periphery of an air channel 102 within the particle concentrator 120. Particle concentrator 120 may include an air channel 102 with a first open end for inlet air stream 112 and a second open end for outlet air stream 118 that allows particles 114 and air stream 106 to traverse the air channel 102. The air channel 102 may be enclosed by one or more channel walls 104 extending from at least the first open end to the second open end. Two or more heater elements 122*a*, 122*b* may be positioned between the first open end and the second open end. The heater elements 122*a*, 122*b* may be positioned near a periphery of the air channel 102 and cooperatively configured to thermophoretically force particles 114 in the air stream 106 away from the periphery and towards an interior region 320 of the air channel 102.

A position-dependent heat profile may be generated along the length of the air channel 102 to drive particles 114 towards the center of the air channel 102, while otherwise allowing the air stream 106 to remain unperturbed. Particles 114 in the air stream 106 may be thermophoretically forced towards the interior region 320 of the air channel when the heater elements 122*a*, 122*b* are heated and thermal gradients emanating from heater elements 122a, 122b are generated. Isothermal lines 324a, 324b show lines of constant temperature within the air stream 106. As power applied to heater elements 122a, 122b changes and as the velocity of air stream 106 is adjusted, the position and the shape of isothermal lines 324a, 324b may change. Thermophoretic forces 326a, 326b may be generated and act on particles 114 as particles 114 in the air stream 106 traverse the air channel 102. Thermophoretic forces 326a, 326b increase as the thermal gradients in the air channel 102 increase and act on particles 114 in the direction of most rapid thermal decrease, that is, in a direction perpendicular to the isothermal lines 324a, 324b and with a magnitude proportional to the gradient of the temperature in the air stream 106. When acted upon by thermophoretic forces 326a, 326b generated by the thermal gradients in the air stream 106, particles 114 may be forced away from the periphery and towards an interior region 320 of the air channel 102. The particles 114 may be deflected across streamlines 108 towards the center of the air channel 102, increasing the concentration of particles 114 in the interior region 320 of the air channel 102. In some implementations, the temperatures of the heater elements 122a, 122b may be varied to control the position of the concentrated particles 114 within the interior region 320 as the particles 114 continue downstream in the air channel 102.

While the interior region 320 of the particle concentrator 120 (and of the particle discriminator 130) is generally centered on the geometric center of the air channel 102 and includes portions of the air channel 102 in the vicinity of the geometric center, in some implementations the interior region 320 may be centered about an axis that is offset from the centerline of the air channel 102. Dimensions of the interior region are generally on the order of the width and/or length of the active sensor area of the particle detector 134, which may be 200 microns or less. As particle fractionation and collection improves with a tighter distribution of particles in the interior region of the air stream 106, device performance improves with a tighter particle distribution. In some implementations, the interior region may be defined as the spatial volume where a simple majority of airborne particles 114 in the air stream 106 are concentrated. In some implementations, the interior region may be defined as a percentage of the channel volume, such as 1%, 2%, 5%, 25% or 50% of the channel volume. In some implementations, the interior region may include the geometric center of the air channel and a percentage of the area about the geometric center, such as 1%, 2%, 5%, 25% or 50% of the cross-sectional area at a point along the centerline of the air channel.

Figure 4:
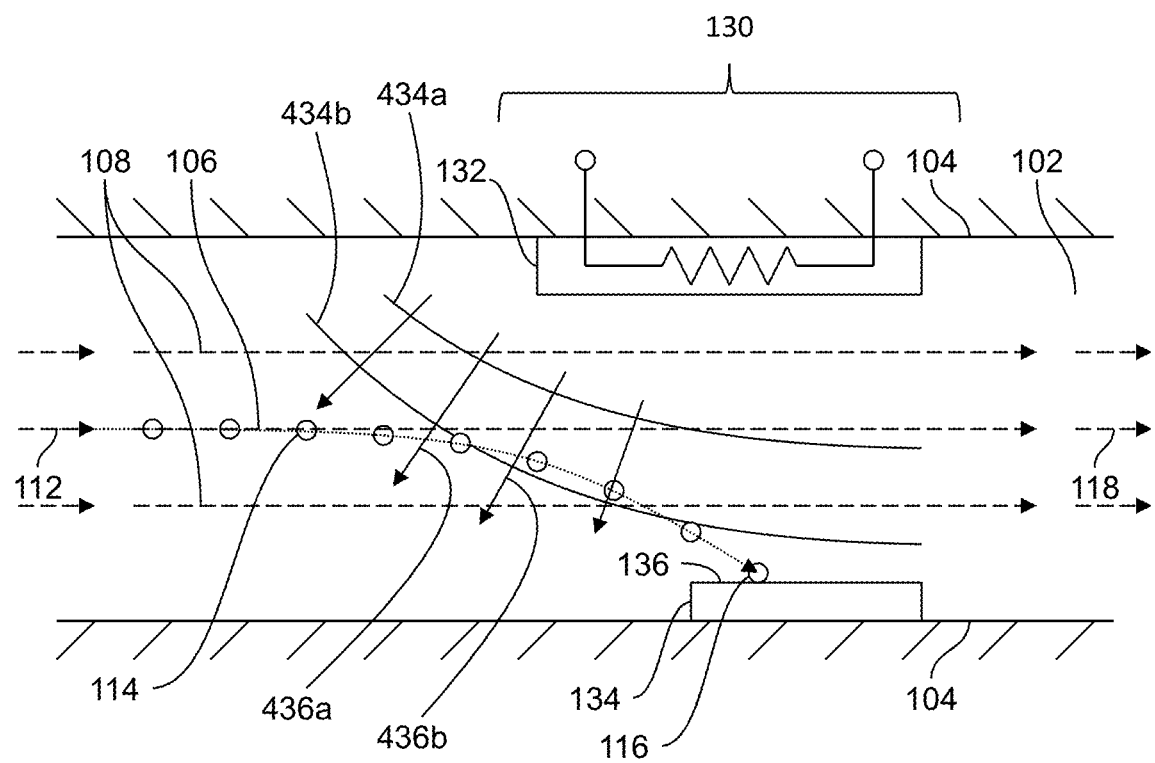
FIG. 4 illustrates elements and operation of a thermophoretic particle discriminator.

FIG. 4 illustrates elements and operation of a thermophoretic particle discriminator 130. The particle discriminator 130, sometimes referred to as a deposition chamber or a settling chamber, includes an air channel 102 having one or more channel walls 104 that contain an air stream 106. The air channel 102 in the particle discriminator 130 may extend from the inlet 110 through a particle concentrator 120 and through the particle discriminator 130. The particle discriminator 130 may be fluidically coupled to the particle concentrator 120 and to the inlet 110. Particles 114 in the air channel 102 may be concentrated in an interior region of the air stream 106 within the particle concentrator 120 and then passed via the fluidically coupled air channel 102 into the particle discriminator 130.

The particle discriminator 130 may include at least one thermophoretic particle discriminator heater element 132. Heater element 132 may be configured to deflect particles 114 in an interior region of the air stream 106 towards a peripheral wall 104 of an air channel 102 that encompasses the air stream 106. A thermal gradient in the air channel 102 generated by the heater element 132 may thermophoretically force particles 114 towards the peripheral wall 104 in a direction perpendicular to the air stream 106. Isothermal lines 434a, 434b show lines of constant temperature. The position and shape of isothermal lines 434a, 434b may change as the power applied to heater element 132 changes and as the velocity of air stream 106 is adjusted.

As particles 114 enter particle discriminator 130, the thermophoretic force generated by one or more heater elements 132 in the particle discriminator 130 may force particles 114 towards a periphery of the air stream 106 near one of the channel walls 104 of the particle discriminator 130. Thermophoretic forces 436a, 436b may be generated and act on particles 114 as particles 114 in the air stream 106 traverse the air channel 102. Thermophoretic forces 436a, 436b increase as the thermal gradient in the air channel 102 increases and act on particles 114 in the direction of greatest decrease in temperature with respect to position. When acted upon by thermophoretic forces 436a, 436b generated by the thermal gradients in the air stream 106, particles 114 are forced away from the interior region of the air channel 102 and towards a periphery wall 104.

The particles 114 may be deflected away from the interior region of the air channel 102 and towards a particle detector 134 positioned on the periphery wall 104 of the air channel 102. The particle detector 134 may be configured to collect particles 114 deflected from the interior region of the air stream 106. Deflected particles 114 may be collected on a surface 136 of a particle detector 134 where the collected particles 116 may be detected and analyzed. Smaller particles in the air stream 106 may be selectively deflected away from the interior region and towards a periphery of the air stream 106 at a different rate than larger particles in the air stream. Particles may be subject to area-dependent viscous and drag forces and to gravitational forces that are density and volume dependent. Heavier particles, for example, may be selectively deflected by gravitational forces at a higher rate than lighter particles of similar size.

Power applied to the heater element 132 of the particle discriminator 130 may be controlled to generate and control thermal gradients in the air channel 102 to deflect particles 114 in a selected particle size range onto a surface 136 of the particle detector 134. The selected particle size range may include a particle size range between about 0.01 microns and 0.1 microns, 0.01 microns and 0.3 microns, 0.1 microns and 1.0 microns, 1.0 microns and 2.5 microns, 2.5 microns and 10.0 microns, and 10.0 microns and larger, or other particle size ranges of interest. Particles 114 not collected by the particle discriminator 130 may continue downstream along one or more streamlines 108 and through the outlet air stream 118. In some implementations, power applied to heater element 132 may be dithered, modulated or otherwise varied to more evenly spread the distribution of collected particles 116 on the surface 136 of the particle detector 134. In some implementations, the power applied to heater element 132 may be varied sequentially in time to collect and analyze particles of a first size during a first time period, then collect and analyze particles of a second size during a second time period, and so forth.

Figure 5:
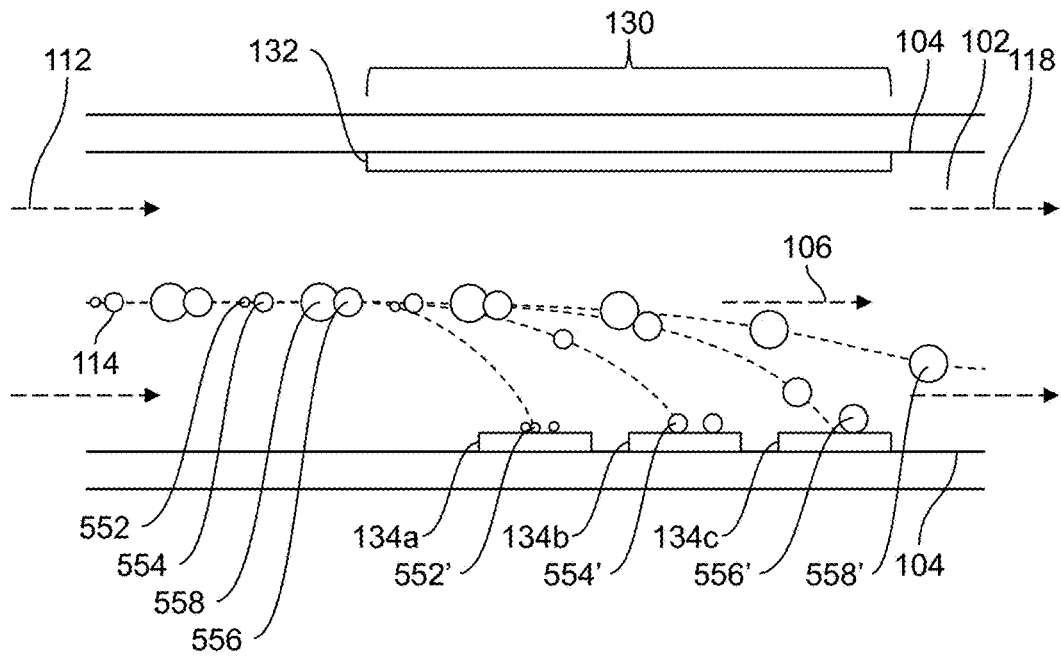
FIG. 5 illustrates a method of fractionating and discriminating concentrated particles in an air stream.
Figure 6:
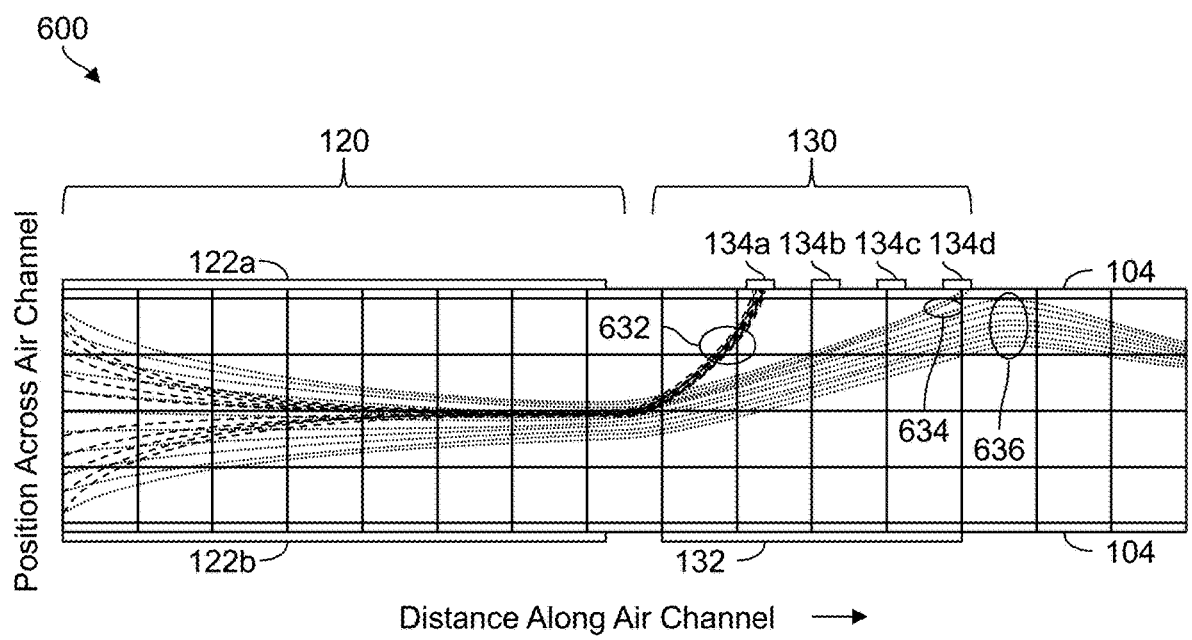
FIG. 6 shows a plot of particle position across an air channel versus distance along the air channel having a thermophoretic particle concentrator and a thermophoretic particle discriminator.

FIG. 5 illustrates a method of fractionating and discriminating concentrated particles 114 in an air stream 106. A cross-sectional view of a particle discriminator 130 is shown with an air channel 102 and channel walls 104 encompassing the air channel 102 and the air stream 106. Particles 114 from an inlet air stream 112 that are concentrated in an interior region of the air stream 106 may be deflected towards a peripheral wall 104 of the air channel 102 with one or more heater elements 132 in the particle discriminator 130. The particles may be deflected with a thermal gradient generated by the heater element 132, with smaller particles 552, 554 in the air stream 106 deflected away from the interior region and towards a periphery of the air stream 106 at a higher rate than larger particles 556, 558 in the air stream. The amount of transverse displacement of the various particles may change in an amount that varies roughly inversely with size of the airborne particles. That is, smaller sized particles are generally deflected more than larger sized particles. The trajectory of smaller particles under the influence of thermophoretic forces is more readily altered compared to larger particles under the same influences, allowing localized particle detectors to distinguish between different particle sizes. The rate of deflection may also be a function of mass, thermal conductivity, surface area, and other properties of the deflected particles. For example, denser particles of similar size may be selectively deflected at a different rate than less dense particles.

A plurality of particle detectors 134*a*, 134*b*, 134*c* may be positioned on a channel wall 104 of the particle discriminator 130 to allow collection and detection of particles within one or more particle size ranges. The lighter (smaller) particles may be collected by the first particle detector 134*a* and the heavier (larger) particles may be collected by the second or third particle detectors 134*b*, 134*c*, allowing the particle discriminator 130 to distinguish between different particle sizes. The physical mechanism for such size fractionation and discrimination assumes some form of pre-focusing or concentration of the particulate matter stream within the air channel 102 to prevent a given particle detector 134*a*, 134*b*, 134*c* from collecting a mixture of different particle sizes from different heights or locations in the sample air stream 106. In the absence of active measures to concentrate the particles 114 into a beam, the particles 114 may be distributed throughout the entire vertical profile of air channel 102. Thus large particles 114 positioned near the bottom of the air channel 102 may be deflected onto the first particle detector 134*a* while smaller particles 114 near the top of the air channel 102 may be deflected onto the second particle detector 134*b*, interfering with the ability of the particle discriminator 130 to distinguish between different particle sizes or other particle properties.

Power to the heater element 132 may be controlled to allow collection of the deflected particles in a particular particle size range onto a surface of one of the particle detectors 134*a*, 134*b*, 134*c*. As illustrated in FIG. 5, smaller particles 552' may be collected on particle detector 134*a*; somewhat larger particles 554' may be collected on particle detector 134*b*; larger particles 556' may be collected on particle detector 134*c*; and the largest particles 558' may remain uncollected and continue along the air stream 106 through the outlet air stream 118, effectively generating a cutoff point for particle collection.

FIG. 6 shows a plot 600 of particle position across an air channel versus distance along the air channel having a thermophoretic particle concentrator 120 and a thermophoretic particle discriminator 130. Particles in the air stream initially distributed uniformly across the channel height enter the particle concentrator 120 and are forced towards the interior region of the air stream by heater elements 122*a*, 122*b* as previously described. The concentrated particles traverse the air channel towards a particle discriminator 130. The particle discriminator 130 is positioned in a downstream direction of the air stream with respect to the particle concentrator 120.

Under normal atmospheric pressure, smaller particles, such as particles under about 2.5 microns in size, are minimally affected by gravity. These particles tend to move through the air channel with minimal deflection due to gravity. Absent any other forces, these particles follow almost the same path as the surrounding air in the air channel. To detect and measure suspended aerosol particles, a precipitating thermophoretic force may be applied to the particles to deflect the particle's trajectory enough so that the particle may be propelled towards and collected on the surface of one or more particle detectors 134*a*, 134*b*, 134*c*, 134*d*.

The particle discriminator 130 may have at least one heater element 132 and an array of particle detectors 134*a*, 134*b*, 134*c*, 134*d* disposed on a wall of the air channel opposite the heater element 132 that is configured to collect deflected and fractionated particles. Lighter and smaller particles 632 may be deflected at a higher rate and collected by particle detector 134*a*. Heavier and larger particles 634 may be deflected at a lower rate and collected by particle detector 134*d*. Still heavier and larger particles 636 may remain uncollected and may be passed along the air channel where they may be deflected downwards by gravitational forces acting on the particles.

Particles smaller than a particular cutoff size, such as 2.5 microns in diameter, may be selectively collected and analyzed by the particle discriminator 130 and particles larger than the cutoff size may continue past the particle discriminator 130. Heavier and larger particles 636 above the cutoff point that are near the periphery of the air channel may experience a lower local velocity of air than that of particles near the center of the air channel, allowing gravitational forces more time to act on the heavier particles. The effect of gravity and the orientation of the particle discriminator 130 can affect the cutoff size.

Because the thermophoretic force can be made much greater than the force of gravity, at least for particles sized less than about 10 microns, the particle sensors may be configured on nearly any surface of the air channel including (relative to the force of gravity) the floor, the ceiling, or the sides of the air channel. Although in this disclosure floor and ceiling mounted particle detectors are mainly discussed, this is not intended to be limiting. Given the comparatively large impact that precipitation heaters can have on particle trajectories, particle sensors can also be mounted on the sides of an air channel (relative to the force of gravity) or upside down as desired.

In some implementations, a thermophoretic particle detection system may be configured with one or more additional stages of particle concentrators 120 and particle discriminators 130 positioned downstream of a first stage. Thermophoretic forces act on smaller particles and deflect the smaller particles at a faster rate than larger particles in the air stream. The first stage allows concentration of particles in the air stream and collection of particles in a first particle size range while passing particles outside of the first range. A second stage allows re-concentrating and re-focusing of particles remaining in the air stream and subsequent collection of particles in a second range with a larger particle size range than the first stage. Additional stages with pairs of particle concentrators 120 and particle discriminators 130 may be added. Each stage may include one or more focusing heaters in the particle concentrator 120 and one or more deflection heaters and particle detectors in the particle discriminator 130 to redirect larger particles towards the center of the air channel that may be re-concentrated and re-deflected for additional collection and analysis. In some implementations, multiple stages of particle concentrators and discriminators allow further separation of resonant-based particle detectors resulting in improved acoustic isolation and less mechanical coupling between detectors for improved sensitivity.

Figure 7:
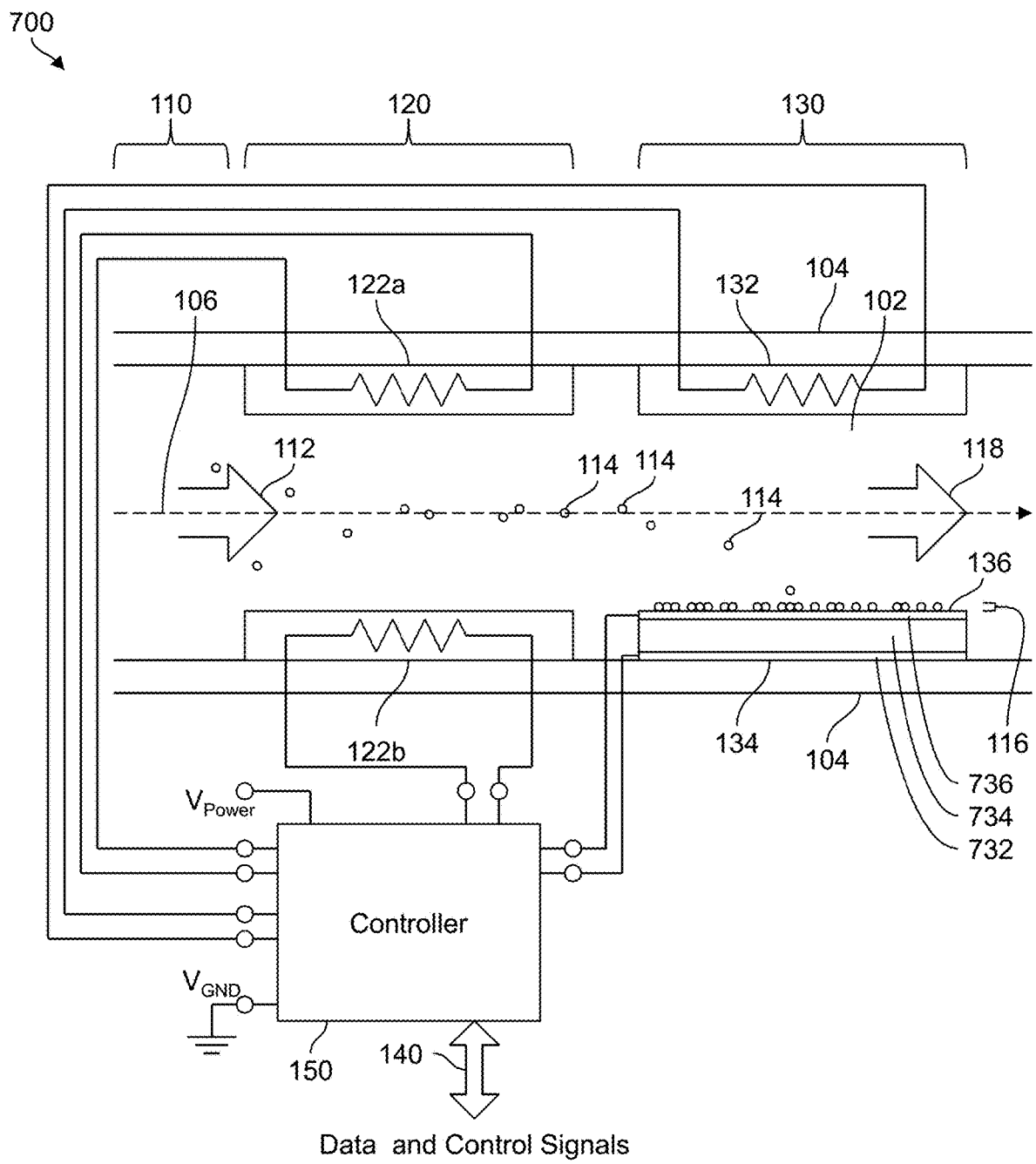
FIG. 7 shows a block diagram of a system for analyzing particles in an air stream.

FIG. 7 shows a block diagram of a system 700 for analyzing particles in an air stream. System 700 includes an inlet 110, a particle concentrator 120 fluidically coupled to the inlet 110, and a particle discriminator 130 fluidically coupled to the particle concentrator 120. The inlet 110, particle concentrator 120 and particle discriminator 130 include an air channel 102 extending through the inlet 110, particle concentrator 120 and particle discriminator 130 for containing an air stream 106. The air channel 102 includes one or more channel walls 104 for containing the air stream 106. One or more heater elements 122a, 122b may be positioned on opposing sides of the air channel 102 within the thermophoretic particle concentrator 120. One or more heater elements 132 may be positioned on a channel wall 104 of air channel 102 within the particle discriminator 130. One or more particle detectors 134 may be positioned on a wall 104 of the particle discriminator 130 opposite the heater elements 132 to collect and detect particles. The particle detectors 134 may include one or more piezoelectric layers 734 with electrode layers 732, 736 on each side of the piezoelectric layer 734.

System 700 may include one or more controllers 150. Controller 150 may include one or more processors configured to allow concentrating particles 114 in an interior region of the air stream 106 within the particle concentrator 120 and deflecting the concentrated particles 114 in the air stream 106 within the particle discriminator 130 with generated and controlled thermal gradients in the air channel 102. Controller 150 may include various electronic circuits, passive devices, metal traces, electrical interconnects and wires for sending signals to and receiving signals from heater elements 122a, 122b, heater element 132 and particle detector 134. Electrical power and ground connections for controller 150 may also be provided.

Controller 150 may include circuitry to operate the particle detector 134 in a resonant mode and to detect changes in the resonant frequency. The circuitry may include signal amplifiers and preamplifiers, signal conditioning circuitry such as filters, mixers, local oscillators, demodulators, phase-lock loops, counters, A-D (analog to digital) convertors, and divide-by-n circuits, and control circuitry to determine the frequency shifts associated with mass loading from collected particles on the surface of the particle detector 134. The controller 150 may include processing circuitry to process data from the particle detector 134 and to analyze properties of the collected particles.

Smaller particles 114 in the air stream 106 may be selectively deflected away from the interior region of the air channel 102 and towards a periphery of the air stream 106 at a higher rate than larger particles 114 in the air stream 106. The controller 150 may be configured to allow controlling the generated thermal gradient to deflect the particles in a selected particle size range onto a surface 136 of the particle detector 134. The controller 150 may be configured to draw air and to control an airstream velocity of the air stream 106 in the air channel 102. The controller 150 may be configured to allow collecting particles 114 within a selected particle size range on the surface 136 of particle detector 134. The controller 150 may be configured to determine an effective mass of the particles 114 collected on the surface 136 of the particle detector 134. The controller 150 may be configured to generate an aerosol mass concentration estimate of the particles 114 within the selected particle size range and provide or send the generated aerosol mass concentration estimate via the data and control signals 140 to another location. The controller may be configured to correct or compensate for temperature, relative humidity, ambient pressure, and other factors. The controller may be configured to operate in these manners using non-transitory computer-readable medium storing computer-readable program code to be executed by at least one processor associated with the controller for analyzing particles in an air stream through use of associated program code including associated program instructions.

Figure 8:
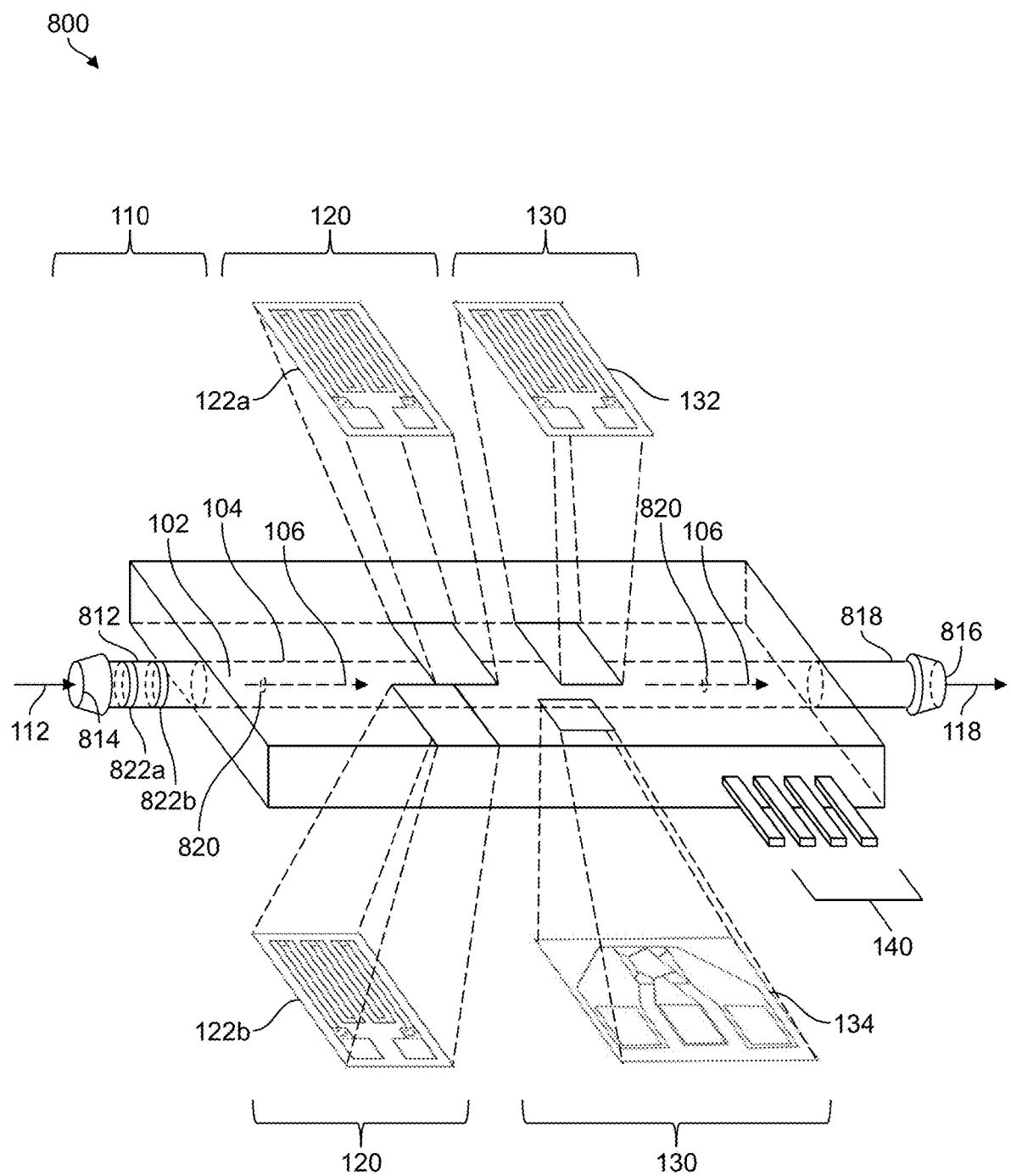
FIG. 8 depicts an exploded view of a system for analyzing particles in an air stream.

FIG. 8 depicts an exploded view of a system 800 for analyzing particles in an air stream 106. System 800 includes an inlet 110 having an inlet port 812 with an open end 814 for an inlet air stream 112. System 800 may include an outlet port 818 with an open end 816 for an outlet air stream 118. An air channel 102 may encompass the air stream 106 and extend from the open end 814 to the open end 816. The size and shape of the open ends 814 and 816 may vary depending on the device and application. For example, circular open ends 814 and 816 may have a diameter between about 30 microns and about 50 millimeters. Rectangular open ends 814 and 816 may have a width between about 30 microns and about 50 millimeters and a height between about 30 microns and about 50 millimeters.

The thermophoretic particle concentrator 120 may have two heater elements 122a, 122b positioned on opposite sides of the air channel 102. A thermophoretic particle discriminator 130 may have one or more heater elements 132 positioned on one side of the air channel 102 and a particle detector 134 positioned on the opposite side of the air channel 102. In the implementation shown in FIG. 8, the air channel 102 is circular and the heater elements 122a, 122b and 132 are positioned along a circumference of the channel wall in a direction substantially perpendicular to the air stream 106 flowing in the air channel 102. Particles in the air stream 106 may be thermophoretically forced towards an interior region 820 of the air channel 102 when the heater elements 122a, 122b are heated and thermal gradients emanating from the heater elements 122a, 122b are generated. Heater elements 122a, 122b and heater element 132 may include one or more thin-film heater elements, resistive films, resistive segments, heater wires, or other heater types. For economic and packaging reasons, the same heater type may be used in either or both the particle concentrator 120 and the particle discriminator 130, although each heater will generally operate at a different temperature depending on their use as a focusing heater or a precipitation heater. The operating temperature may vary depending in part on the shape and placement of the heater elements, the resistivity of the heater elements, and the applied power. Operating temperatures for heater elements in the thermophoretic particle concentrator 120 are typically between about 20 degrees centigrade and 50 degrees centigrade above ambient temperature. Operating temperatures for heater elements in the thermophoretic particle discriminator 130 are generally higher and are typically between about 50 degrees centigrade and 200 degrees centigrade above ambient temperature for effective control of particle movement. The temperature of the heater elements 122a, 122b and 132 and the thermal gradients generated therefrom may be controlled by controlling the electrical power applied to each of the heater elements, such as by controlling the amount of electrical current passed through the heater elements or by controlling the voltage applied across the terminals of the heater elements.

One or more banded heater elements 822a, 822b may be positioned on or around portions of the inlet port 812. The banded heater elements 822a, 822b allow circular or rectangular inlet ports 812 to be surrounded with heater elements that extend around the entire inlet wall 104. The banded heater elements 822a, 822b may be configured with heater segments disposed on opposite sides of the air channel 102 that encompasses the air stream 106. Power applied to inlet heater elements 822a, 822b may generate thermophoretic forces acting on particles in the incident air stream 106, forcing the particles away from the walls 104 of the air channel 102 towards an interior region 820 of the air stream 106 and beginning the particle concentration process. Further concentration of particles in the air stream 106 may occur in the thermophoretic particle concentrator 120 downstream of the inlet air stream 112. Temperatures generated by the banded heater elements 822a, 822b may be as low as a few degrees above ambient temperature to deter particles from collecting on surfaces of the inlet port 812. The banded heater elements 822*a*, 822*b* may be configured to control or limit the level of moisture or humidity in the air channel 102 during use.

Data and control signals 140 may be communicated to and from system 800 with one or more electrical connectors and signal lines coupled to system 800. The air channel 102 includes one or more channel walls 104. The sides of the air channel 102 will normally be surrounded by walls 104, except at the open ends for the inlet air stream 112 and the outlet air stream 118. At least one particle detector 134 may be positioned along the wall 104 and configured so that the airborne particles, after being propelled transversely by the precipitation heat gradient produced by the precipitation heater element 132, may be detected by the particle detector 134.

While thermophoretic particle discriminators 130 are generally used as exemplary embodiments in the various descriptions contained herein, other detection devices and methods such as particle sensors that operate by laser light scattering are also possible and are not disclaimed by this disclosure. The embodiments described herein may operate with many different types of particle sensors. MEMS-based particle sensors and in particular an FBAR sensor or an addressable array of FBAR sensors are presented as a particular type of particle detector that may be used.

Air or other carrier gas may be drawn through the air channel 102 with an air movement device (not shown) generally positioned downstream of the outlet air stream 118 to generate the air stream 106. The air movement device may include a pump, blower, fan, turbine, motorized air intake device, bellows pump, membrane pump, peristaltic pump, piston pump, positive-displacement pump, rotary vane pump, Venturi device, airflow management device, or other air drawing means for moving or drawing air through the air channel 102. In some implementations, the air velocity of the inlet air stream 112 in the system 800 may be adequate without requiring active airflow generation by using a passive airflow mechanism such as an ambient air flow, an ambient pressure drop across the length of the air channel, or a convective heat process.

Particulate filters (not shown) and protective screens may be used upstream of the particle concentrator 120 to filter out particularly large particles and to protect the air channel 102 from accumulating undesirable debris. In some implementations, a size-selective particle filter or a size-selective input device may be included as part of the inlet 110 or placed upstream of the inlet 110. In some implementations, the walls 104 of the air channel 102 may be mechanically supported and mounted in a way that provides for improved thermal isolation. In some implementations, the air channel 102 may be suspended in an aerogel that provides good mechanical robustness and good thermal isolation.

FIGS. 9A-9I illustrate top and cross-sectional views of various thin-film heater elements for use in systems for analyzing particles. Thin-film heater element 900 shown in FIG. 9A includes a thin heater layer 910 such as a patterned layer of nickel, chrome-nickel or platinum. Electrical bond pads 940 and 950 allow electrical connections to the heater layer 910 via heater contact regions 944 and 954, respectively. One or more electrical traces 946 may be used to facilitate electrical connections between bond pad 940 and contact region 944. Similarly, one or more electrical traces 956 may be used to facilitate electrical connections between bond pad 950 and contact region 954. The illustrative cross-sectional view shown in FIG. 9B taken through dashed lines AA' in FIG. 9A shows heater layer 910 positioned between two insulating layers 912 and 916 such as layers of silicon dioxide or silicon nitride. The heater layer 910 may be positioned above a cavity region 918 defined in a heater substrate 920 to reduce power loss through the heater substrate 920. Bond wires 942 and 952, or other connective wiring, may be used to make connections to bond pads 940 and 950, respectively.

FIG. 9C shows a thin-film heater element 900 with heater layer 910 patterned in a serpentine manner having various heater segments 922*a*-922*f* serially connected to each other and electrically connected to electrical bond pads 940 and 950. Alternative implementations of thin-film heater elements include metal foil formed into electrically connected serpentine heater segments on polyimide film backing such as Kapton tape with patterned electrodes, or other microfabricated heater elements such as polysilicon heater elements formed on fused quartz substrates. In some implementations, other sources of heat such as high-resistivity wire, heat pipes, radiant heating or inductive heating may be used to generate the thermal gradients.

FIG. 9D illustrates a cross-sectional view of a thermally isolated wall-mounted thin-film heater element 900 with a polymeric barrier layer 904 that may serve as a channel wall of an air channel. The wall-mounted thin-film heater element 900 in FIG. 9D presents no structural features in the air channel except for the relatively smooth outer surface of the polymeric barrier layer 904, minimizing the level of any airflow disruptions in the air stream. A thin heater layer 910 may be formed separately on a plastic heater substrate 920 and laminated or otherwise attached to the barrier layer 904 with an adhesive layer 906 such as a UV-curable adhesive or epoxy. The heater layer 910 may be electrically connected to bond pads 940 and 950 with one or more electrical traces 946 and 956, respectively. The bond pads 940 and 950 may be attached with anisotropic conductive film (ACF) 980 to electrical interconnects formed on one or more interconnect layers 962, 964 through one or more plated flex via holes 966 and dielectric layers 968 included in a flexible printed circuit board 960 (also referred to as a "flex"). The construction shown with a cutout region in one of the flex layers 970 generates a cavity region 918 between the heater layer 910 and the underlying flex layer 972 that allows a higher level of thermal isolation and lower operating power to achieve the same operating temperature. Additional cavity regions (not shown) may be formed in underlying flex layers 972, 974 of the flexible printed circuit board 960 to achieve additional thermal isolation. Thermal isolation of the thin-film heater layer 910 may result in improved temperature control, less temperature variation, and lower operating power. The cavity region 918 may be filled with an aerogel or other thermally insulating material to provide mechanical strength in addition to thermal isolation.

Figure 9A:
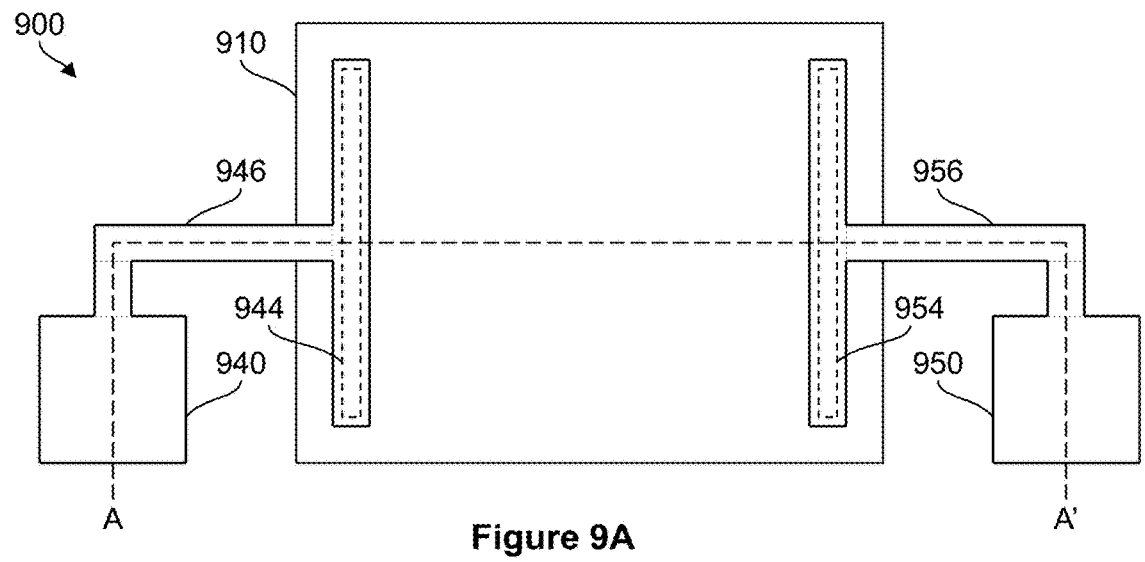
FIGS. 9A-9I illustrate top and cross-sectional views of various thin-film heater elements for use in systems for analyzing particles.
Figure 9B:
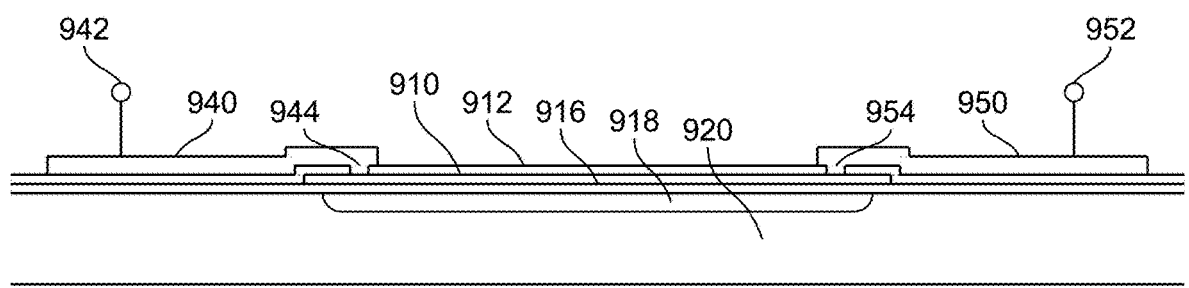
Figure 9C:
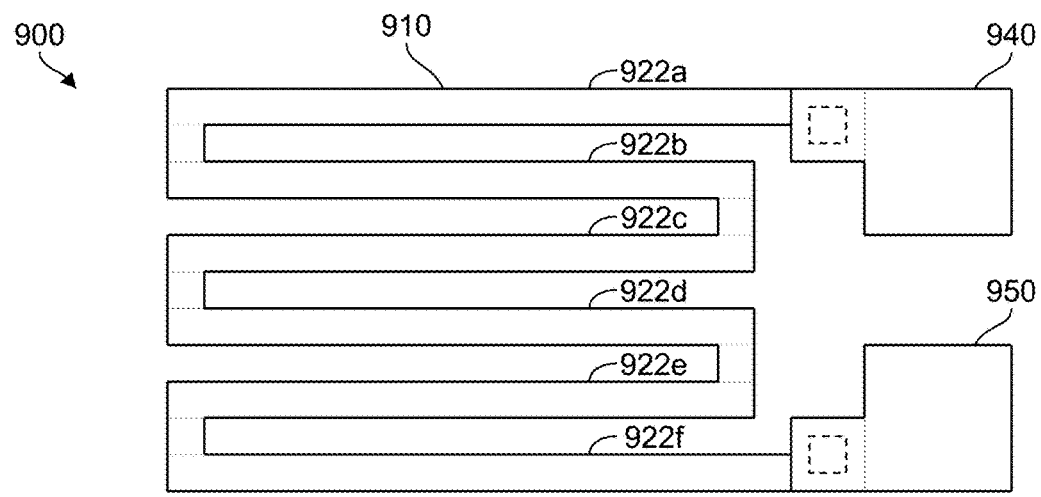
Figure 9D:
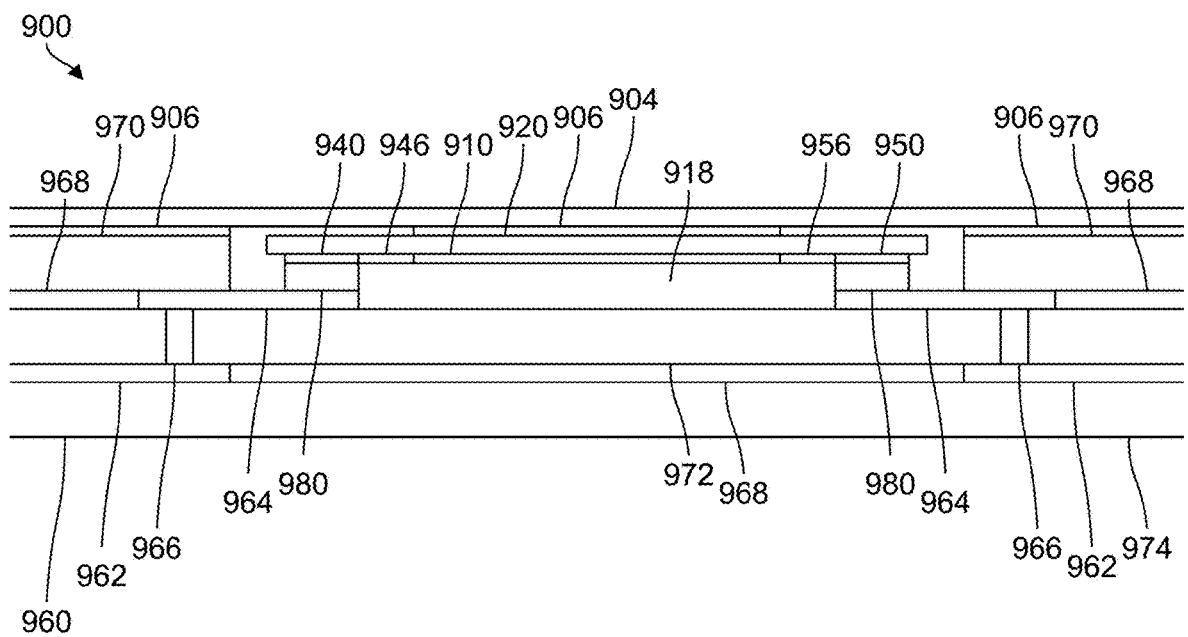
Figure 9E:
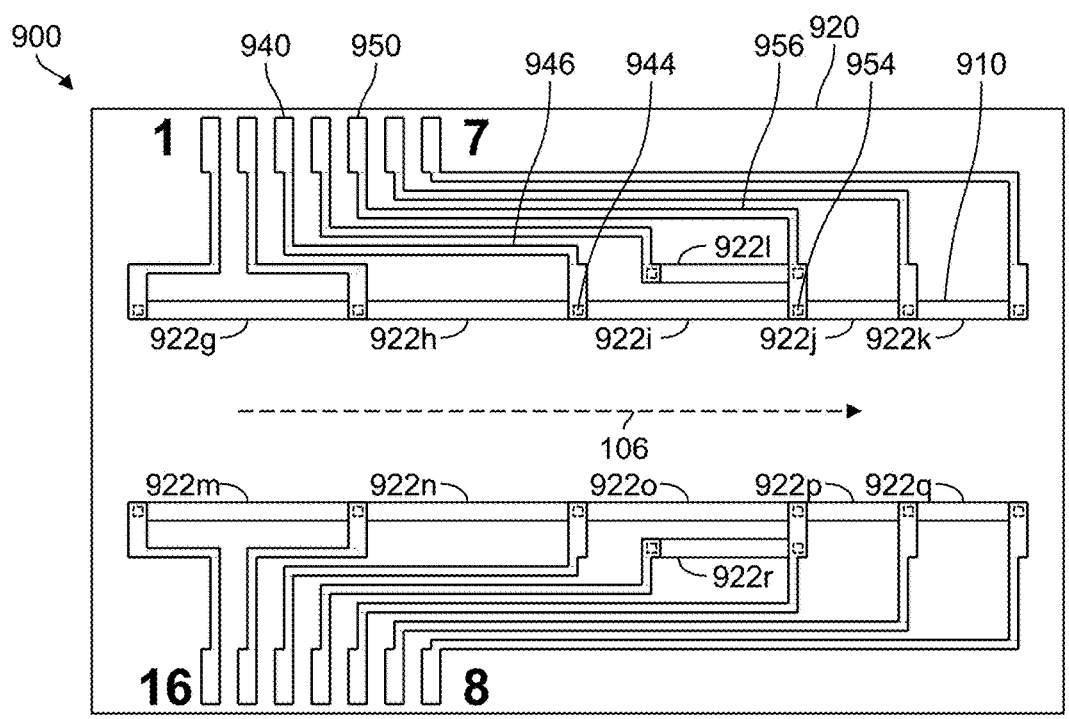

FIG. 9E illustrates a top view of a multi-tapped thin-film heater element 900. The multi-tapped thin-film heater element 900 in FIG. 9E may be attached to a polymeric barrier layer that in turn may serve as a channel wall of an air channel. The heater layer 910 may be disposed on a plastic heater substrate 920 and electrically connected to bond pads 940, 950 via the contact regions 944, 954 and electrical traces 946, 956, among others. Each heater segment 922g through 922r between two adjacent heater taps may be individually controlled by the voltages applied across each segment to allow control of a temperature profile in an adjacent air stream 106. Voltages between adjacent heater taps can step up or step down in voltage level as desired to control the power applied to the heater segment between the adjacent heater taps. Setting the electrical potential difference to zero across any two adjacent heater taps reduces the thermal generation between the two adjacent heater taps to zero, allowing temperature zone control and flow-dependent temperature distributions along the length of the multi-tapped heater element. Multi-tapped heater elements require fewer electrical connections compared to individually tapped heater elements and allow closer-spaced and continuous heater segments for improved temperature profile control. One or more pairs of multi-tapped heater elements may be formed on the heater substrate 920. The heater segments between any two heater taps may be formed in any one of a variety of shapes including straight segments, curved segments, angled segments, tapered segments, serpentine segments and segments with varying widths. One or more stub heater segments 922l, 922r may be included on the substrate 920 with independent electrical access to allow additional control over the temperature profile and thermal gradients generated in the air stream 106.

Figure 9F:
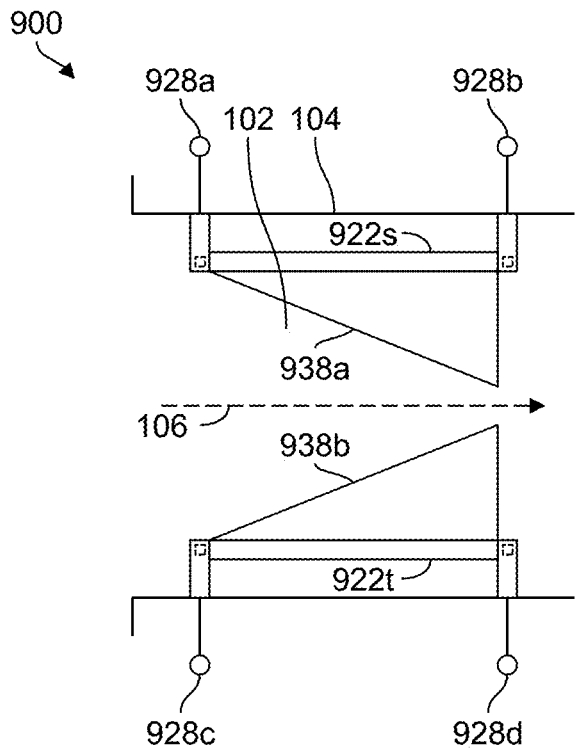
Figure 9G:
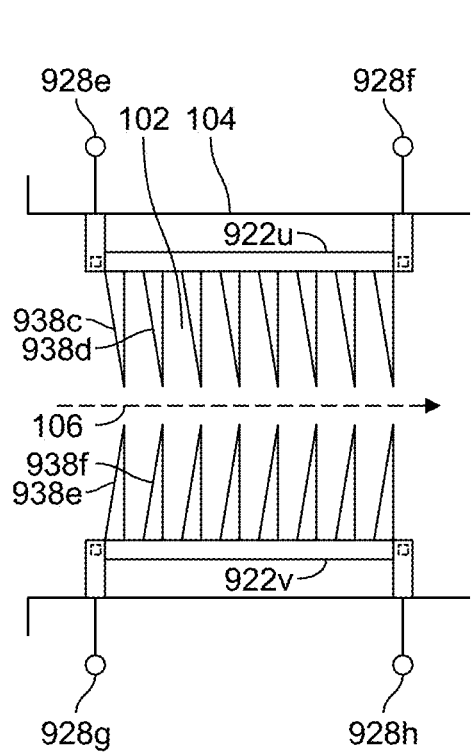
Figure 9H:
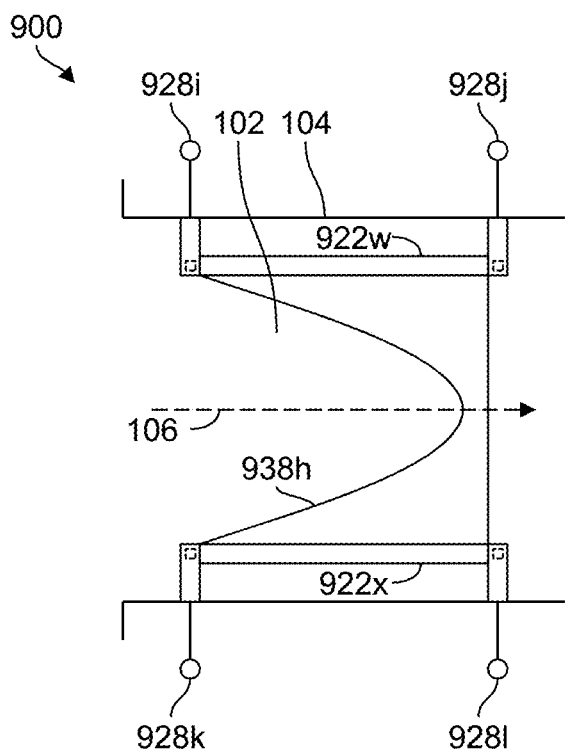
Figure 9I:
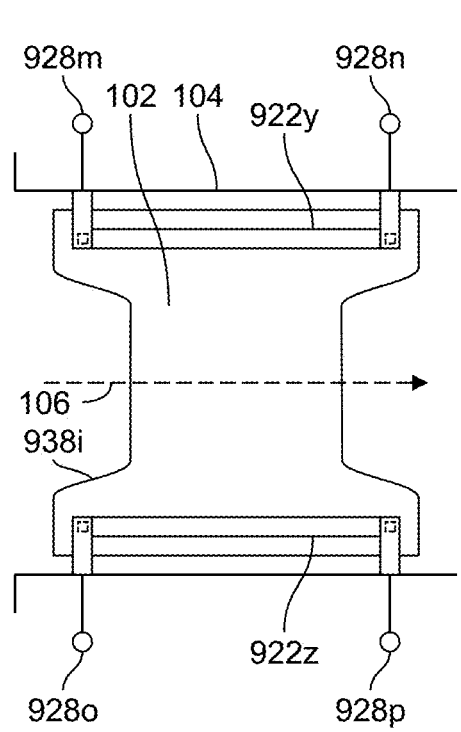

FIG. 9F through FIG. 9I show top views of various thin-film heater elements 900 with thermally coupled heat spreaders. Heat spreaders are thermally conductive structures that heat up when nearby thermally coupled heater elements or heater segments are heated up. The heat spreaders may heat up to temperatures that are generally less than the temperature of the associated heater element, allowing improved control of the temperature distribution across the air channel 102 as an air stream 106 passes by the heater elements and heat spreaders. The heat spreaders may or may not carry current and are largely passive devices. While the heat spreaders may be mechanically and electrically connected to and in some implementations be formed from the same material as the heater elements, the heat spreaders may be fully passive devices that are electrically isolated from the heater elements yet close enough to extract thermal energy from the heater elements and redistribute the thermal energy throughout other portions of the air channel. The quantity and shape of the heat spreaders may vary from heater to heater or from segment to segment within the same air channel. For example, a pair of triangular heat spreaders 938a, 938b may be thermally coupled to heater segments 922s, 922t positioned near a channel wall 104 of an air channel 102 to selectively heat up air or other gas in the air stream 106 flowing through the air channel 102, as shown in FIG. 9F. An array of spike-shaped heat spreaders 938c, 938d, 938e, 938f among others may be thermally coupled to heater segments 922u, 922v, as shown in FIG. 9G. A thermally coupled heat spreader 938h that extends across the air channel 102 to heater segments 922w, 922x may be tapered or otherwise contoured between the heater segments 922w, 922x, as shown in FIG. 9H. Heat spreader 938i may extend between and overlap associated heater segments 922y, 922z, as shown in FIG. 9I. Heater taps 928a through 928p may provide electrical connectivity to each of the heater elements or heater segments, here shown in FIG. 9F through FIG. 9I. One or more passive metallic heat shunts (not shown) may be configured on one or more layers of a multi-layer flexible printed circuit board to serve as a thermal load and to alter the dynamic temperature response resulting in higher and more controlled thermal gradients in the air channel. One or more heat sinks (not shown) may be included to maintain a desired temperature such as an ambient temperature along one or more portions of the air channel.

Figure 10A:
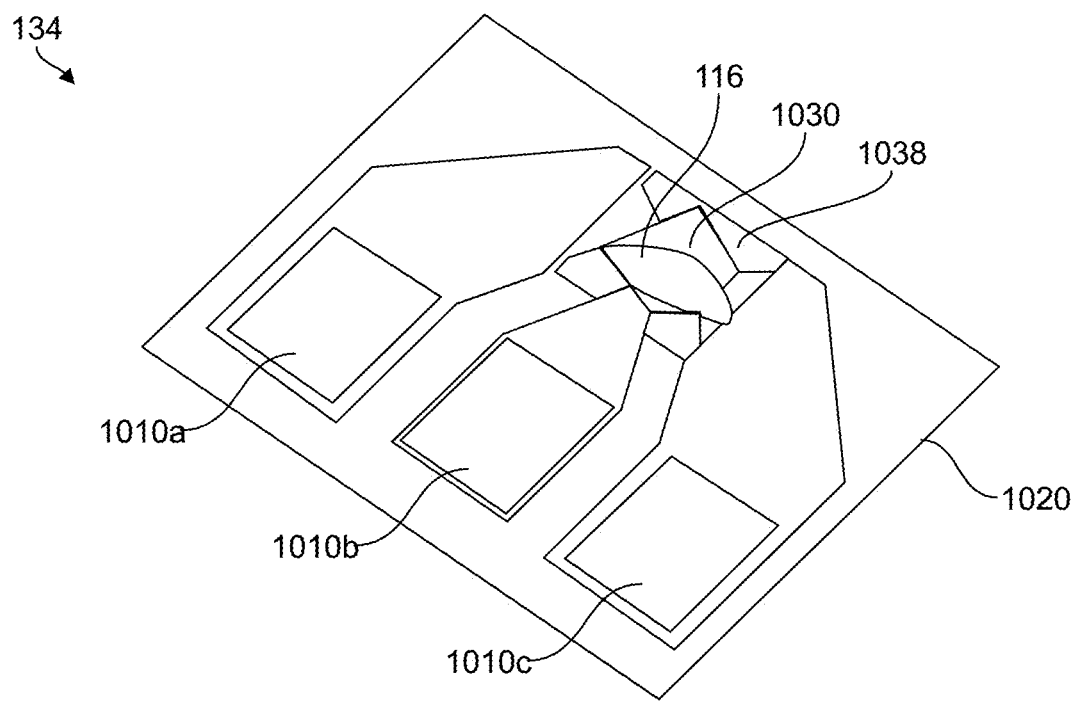
Figure 10B:
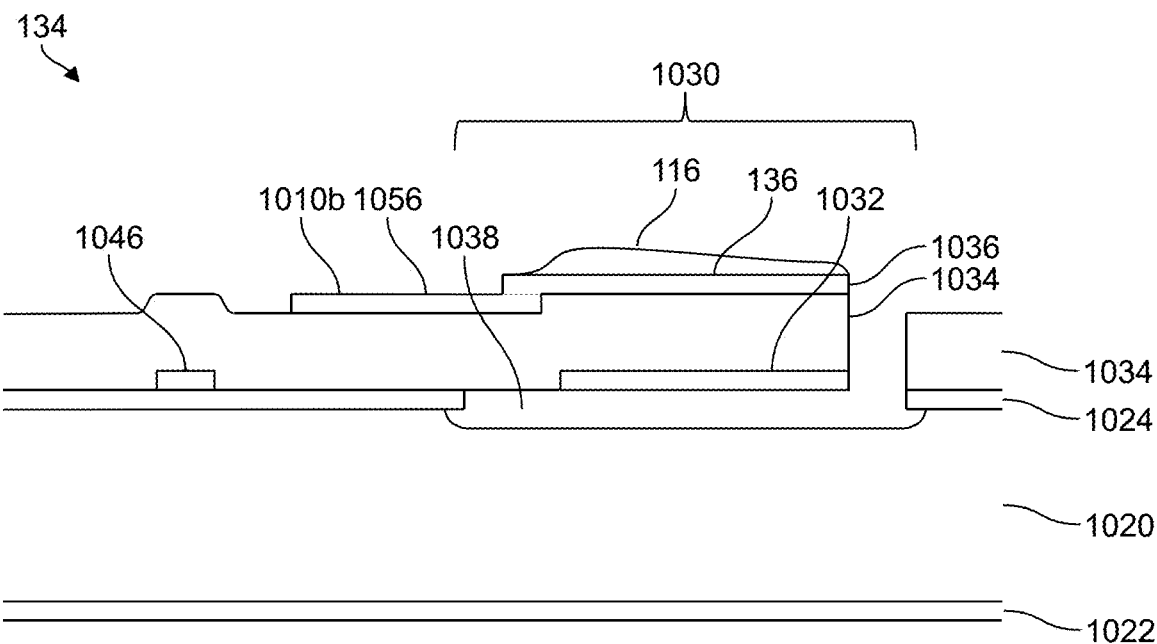

Various heat spreaders, stub heaters, heat shunts and heat sinks may be combined with one or more multi-tapped thin-film heater elements and control electronics to generate the desired thermal gradients in the air channel for focusing, concentrating, deflecting and collecting particles in the air stream. Thermal potential wells generated in the air stream with control of the thermal fields from the various heat spreaders, stub heaters, heat shunts, heat sinks, heater segments and heater elements can effectively garner and capture particles in the air stream 106 for detection and analysis.

FIGS. 10A-10C illustrate perspective and cross-sectional views of a resonant-based particle detector 134. The resonant-based particle detector 134 may be an acoustic resonator device such as quartz crystal microbalance or a film bulk acoustic resonator having a surface exposed to air or gas-borne particles. Particles collected on the surface of the resonator may change the resonant frequency of the resonant device. The change in the resonant frequency due to the additional mass loading may be detected electronically. The resonant device may operate in a frequency range between a few megahertz and several gigahertz, with a detectable frequency shift on the order of a few Hertz that generally shifts downwards as mass is added.

The particle detector 134 may include one or more of a bulk acoustic wave (BAW) resonator, a thin-film bulk acoustic wave resonator (FBAR), a solidly mounted resonator (SMR), a quartz crystal microbalance (QCM), a wall-mounted particle detector, a time-of-flight detector, a resonant sensor, a capacitive sensor, an infrared sensor, an optical sensor, a UV sensor, or a particle mass detector. In some implementations, the particle detector may include a one-dimensional or two-dimensional array of such sensors, and/or more than one type of particle sensor. The particle detector may be positioned on or near a wall of an air channel 102 and may be arranged under or near a heater element 132 of a particle discriminator 130. In some implementations, particles in a selected particle size range may be deflected and collected on a surface 136 of the particle detector 134. The particle detector 134 may be used to determine an effective mass and other properties of the particles collected on the surface such as an aerosol mass concentration estimate.

In the implementation of FIG. 10A, a depiction of an FBAR-based particle detector 134 is shown including bond pads 1010*a*, 1010*b*, 1010*c* disposed on a substrate 1020 with an FBAR 1030 suspended over a cavity 1038 and a portion of the collected particles 116 on a surface 136 of the FBAR 1030. Bond pads 1010*a*, 1010*b*, 1010*c* may be used to make electrical connections such as signal and ground to the FBAR 1030. The cross-sectional view of the FBAR 1030 in FIG. 10B shows the collected particles 116 on the surface 136 of the FBAR 1030. The FBAR 1030 may include a piezoelectric layer stack having a piezoelectric layer 1034, an upper electrode 1036, and a lower electrode 1032 suspended over a cavity 1038 with the FBAR 1030 suspended partially over a cavity region 1038 formed in the substrate 1020. The cavity 1038 may be formed underneath the piezoelectric layer stack to improve the acoustic isolation and reduce energy loss to the substrate 1020. One or more dielectric layers 1022, 1024 such as a layer of silicon dioxide or silicon nitride may be used to provide electrical isolation for the bond pads 1010a, 1010b, 1010c and various electrical traces 1046, 1056 positioned between the FBAR electrodes 1032, 1036 and the bond pads 1010a, 1010b, 1010c. In some implementations, the electrodes 1032, 1036 and electrical traces 1046, 1056 may comprise one or more layers of aluminum or molybdenum.

Figure 10C:
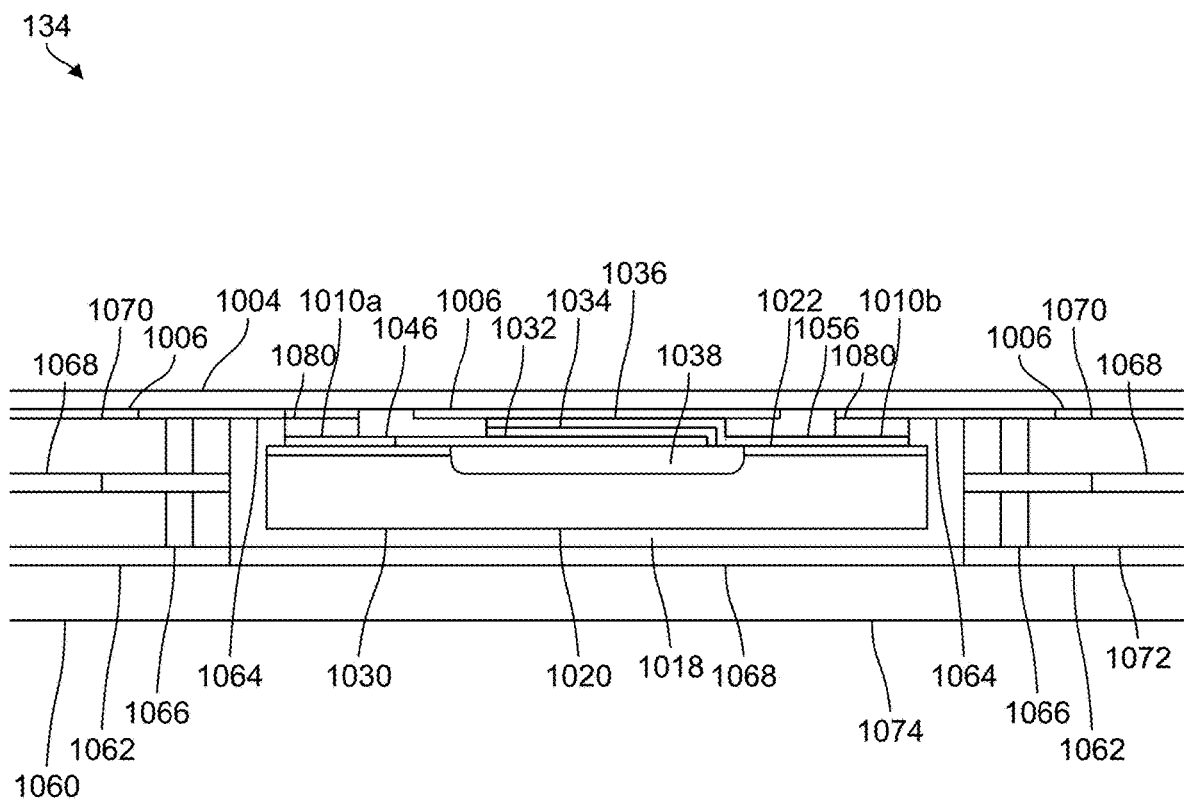

FIG. 10C illustrates a cross-sectional view of an acoustically isolated wall-mounted particle detector 134 with a polymeric barrier layer 1004 that may serve as one of the channel walls of an air channel. The wall-mounted particle detector 134 presents no structural features in the air channel except for the relatively smooth outer surface of the polymeric barrier layer 1004, minimizing the level of any airflow disruptions in the air stream. The particle detector 134 may include an FBAR 1030 having a piezoelectric layer stack with a piezoelectric layer 1034, an upper electrode 1036, and a lower electrode 1032 suspended over a cavity region 1038 in the substrate 1020. One or more dielectric layers 1022 may be used to provide electrical isolation for the bond pads 1010a, 1010b and various electrical traces 1046, 1056 positioned between the FBAR electrodes 1032, 1036 and the bond pads 1010a, 1010b. The FBAR 1030 may be laminated or otherwise attached to the barrier layer 1004 with an adhesive layer 1006 such as a UV-curable adhesive or epoxy. The bond pads 1010a and 1010b may be attached with anisotropic conductive film (ACF) 1080 to electrical interconnects formed on one or more interconnect layers 1062, 1064 through one or more plated flex via holes 1066 and dielectric layers 1068 included in a flexible printed circuit board 1060. The construction shown with a cutout region in two of the flex layers 1070 and 1072 generates a cavity region 1018 between the substrate 1020 and the underlying flex layer 1074 that allows a higher level of mechanical and acoustic isolation for the particle detector 134. Mechanical isolation of the particle detector 134 may result in improved sensitivity to added mass and less acoustic and mechanical coupling to other components.

Thermophoretic particle detection systems may include one or more flex-based wall-mounted heater elements such as that shown in FIG. 9D and one or more flex-based wall-mounted particle detectors 134 such as that shown in FIG. 10C. Flex-based air channels may be formed by combining the flex-based heater elements and the flex-based particle detectors with suitable flex-based sidewalls to form a rectangular air channel with continuous, smooth walls and surfaces through the inlet, particle concentrator and particle discriminator. For example, one or more layers of polyimide may be combined with the multi-layer flex assemblies and be used as the polymeric barrier layer 904 and 1004 and as the side walls of the air channel for a compact, low-profile airborne particle detector.

Figure 11A:
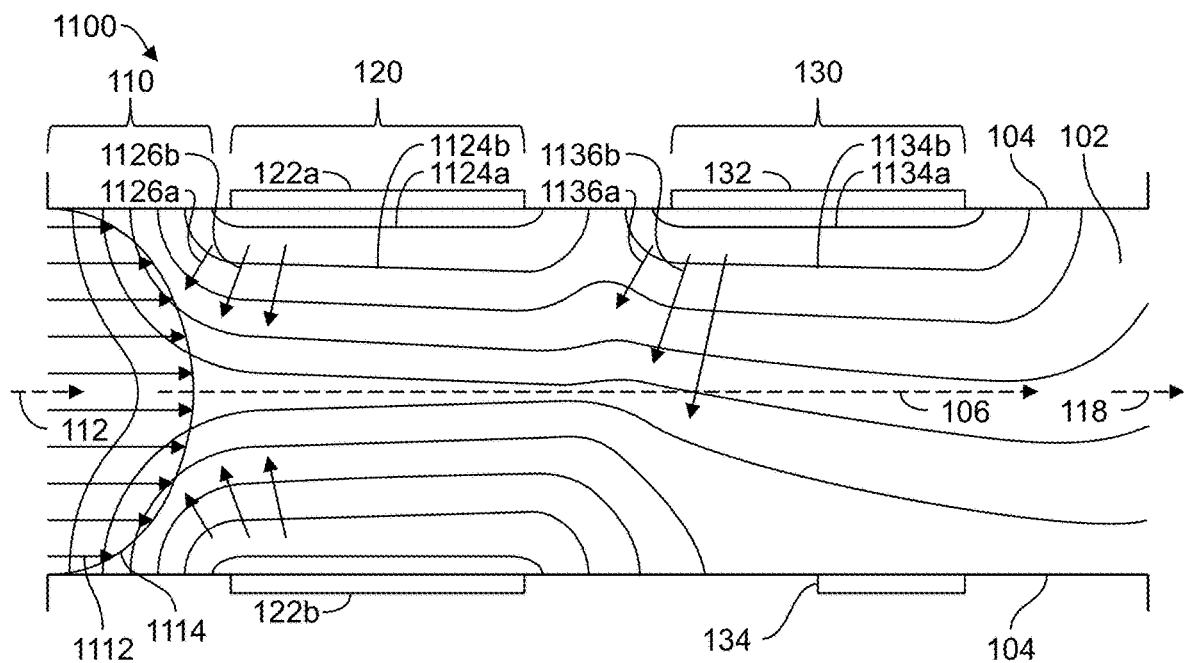
Figure 11B:
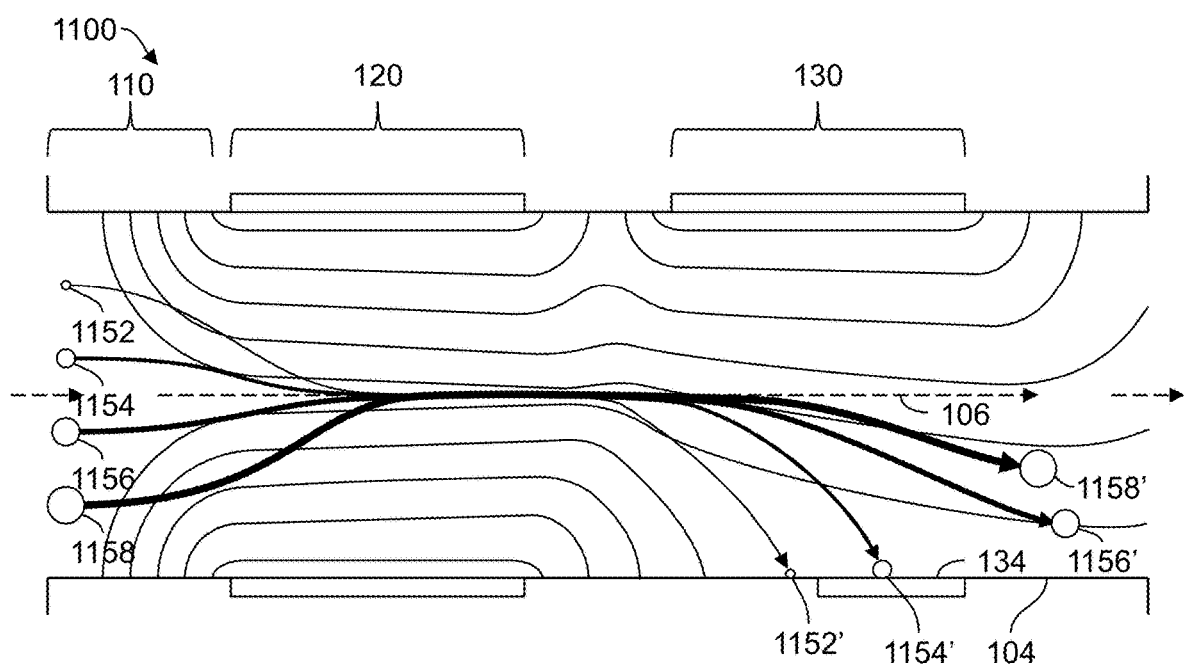
Figure 12A:
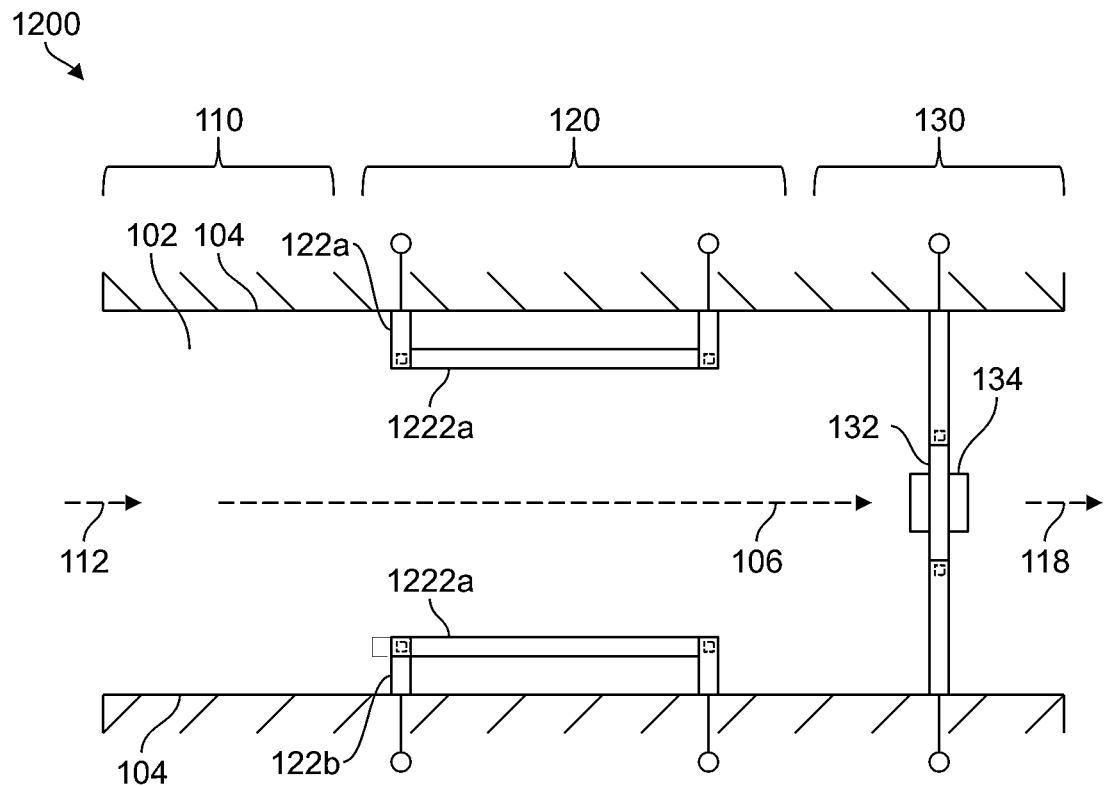
Figure 12B:
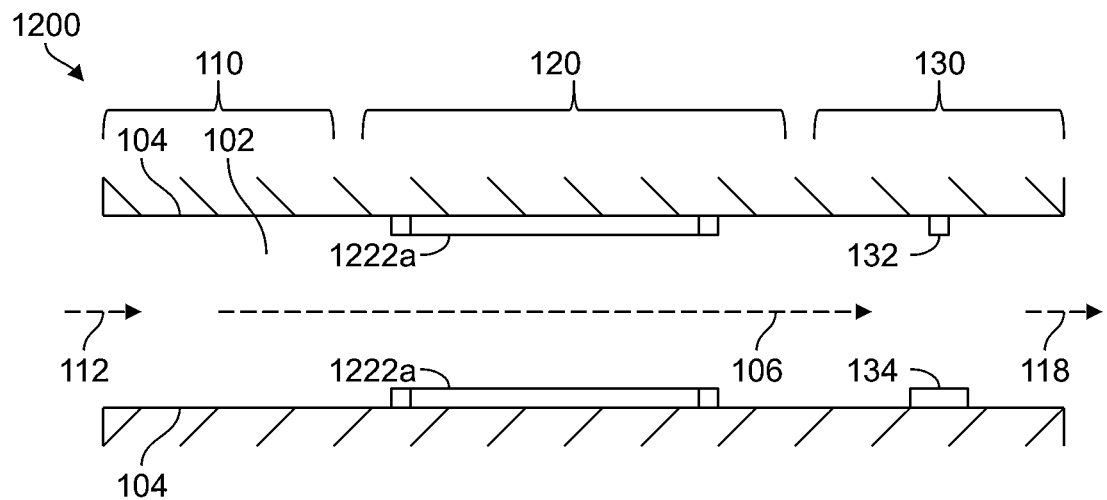

FIGS. 11A-11B illustrate operation of a system 1100 for analyzing particles in an air stream 106. FIG. 11A shows a cross-sectional view of a system 1100 having an inlet 110, a thermophoretic particle concentrator 120 and a thermophoretic particle discriminator 130. An inlet air stream 112 entering an air channel 102 between walls 104 at various local velocities 1112 forms a local velocity profile 1114 that can vary across the width, height and length of the air channel 102 yet generally has a higher local velocity near the center of the air channel 102 that diminishes to nearly zero near the walls 104 of the air channel 102.

When heater elements 122a, 122b on opposite sides of the particle concentrator 120 are heated, thermal gradients are generated throughout the air channel 102, which in turn generate thermophoretic forces 1126a, 1126b that are perpendicular to isothermal lines 1124a, 1124b and point generally in the direction of the steepest negative thermal gradient. Particles in the air stream 106 may be directed away from a periphery of the air channel 102 in the particle concentrator 120 and towards an interior region of the air channel 102.

When heater elements 132 on one side of the particle discriminator 130 are heated, thermal gradients are generated throughout the air channel 102, which in turn generate thermophoretic forces 1136a, 1136b that are perpendicular to isothermal lines 1134a, 1134b and point in the direction of the steepest negative thermal gradient. Particles in the air stream 106 within the air channel 102 may be directed away from an interior region of the air channel 102 in the particle discriminator 130 towards a periphery of the air channel 102.

Figure 13A:
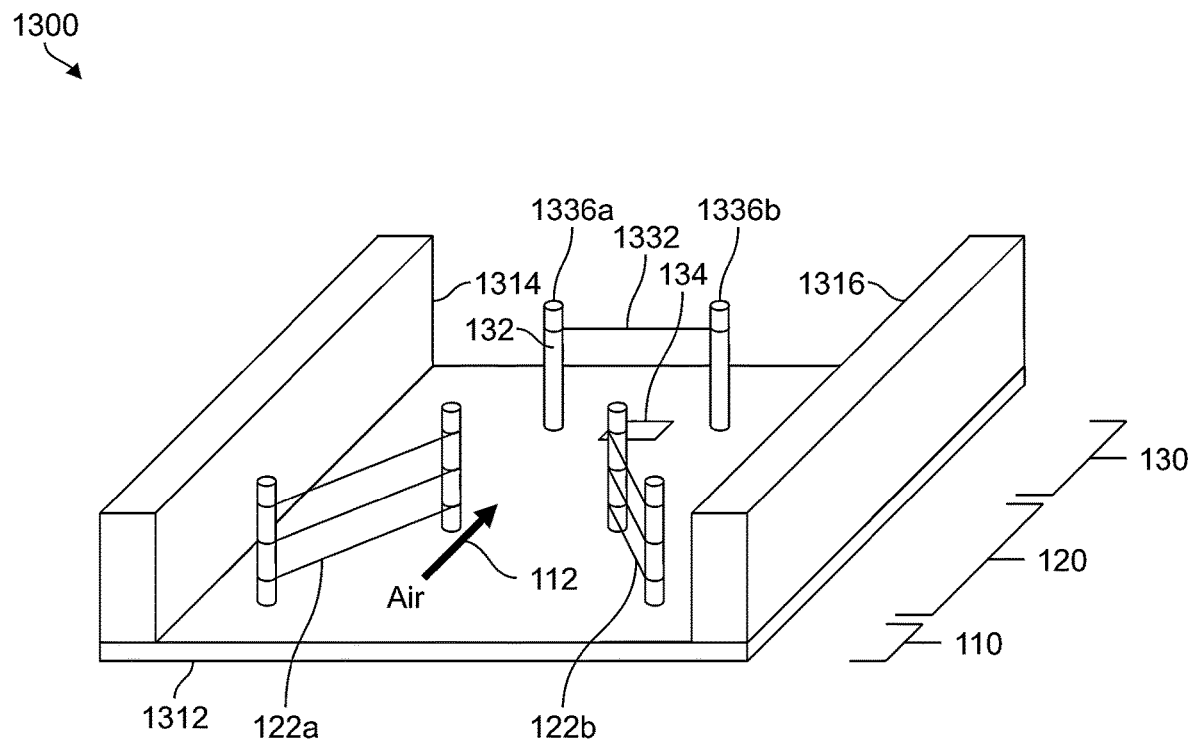
Figure 13B:
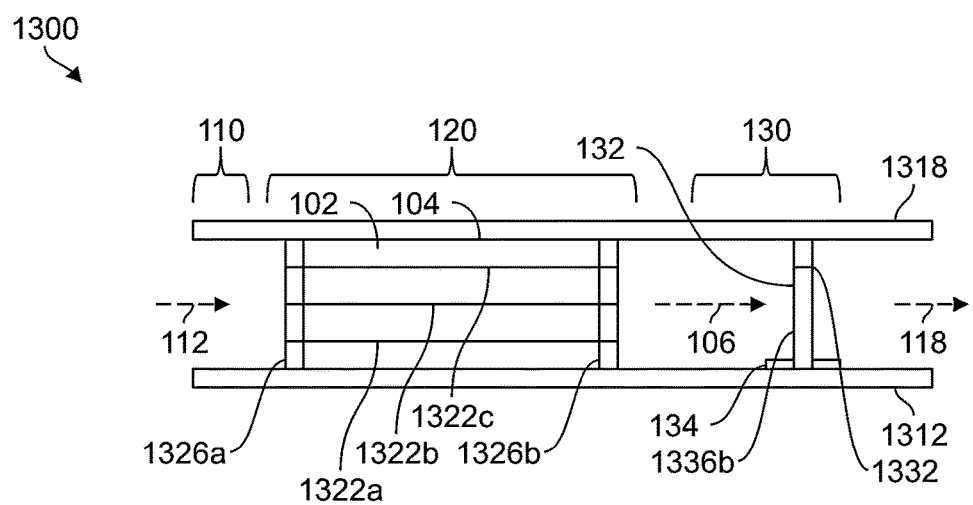
Figure 14A:
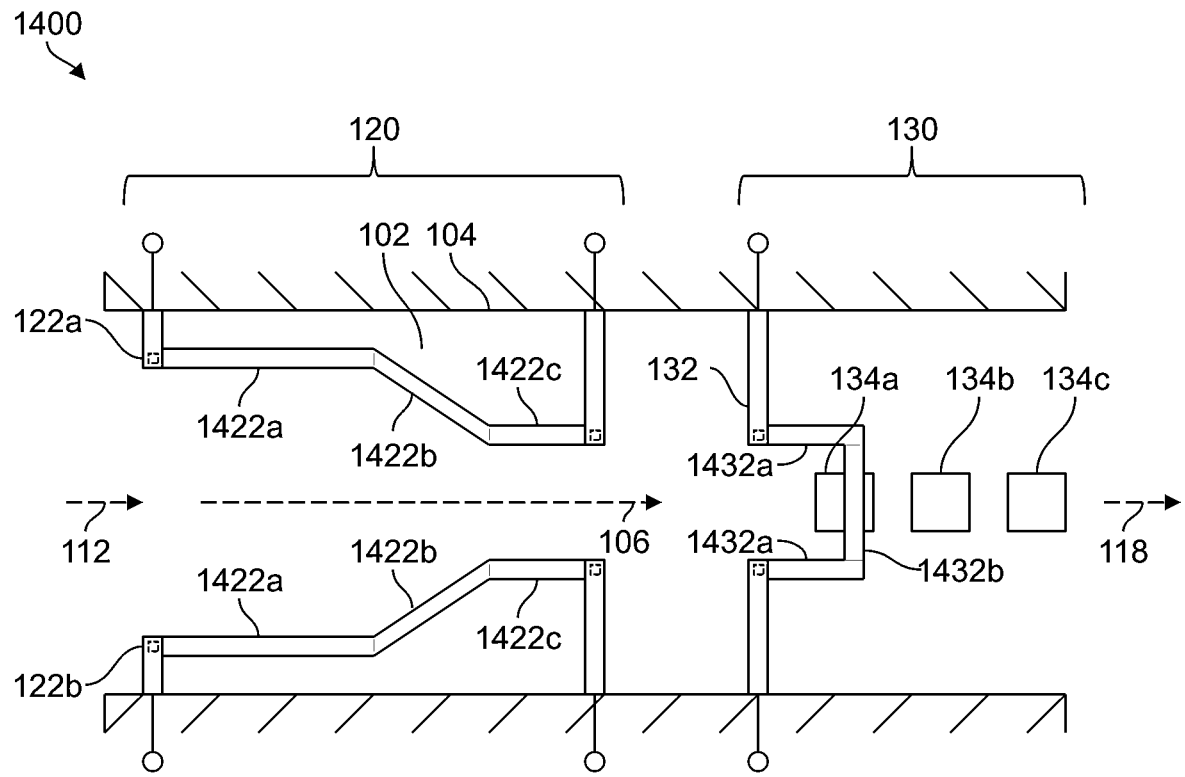
Figure 14B:
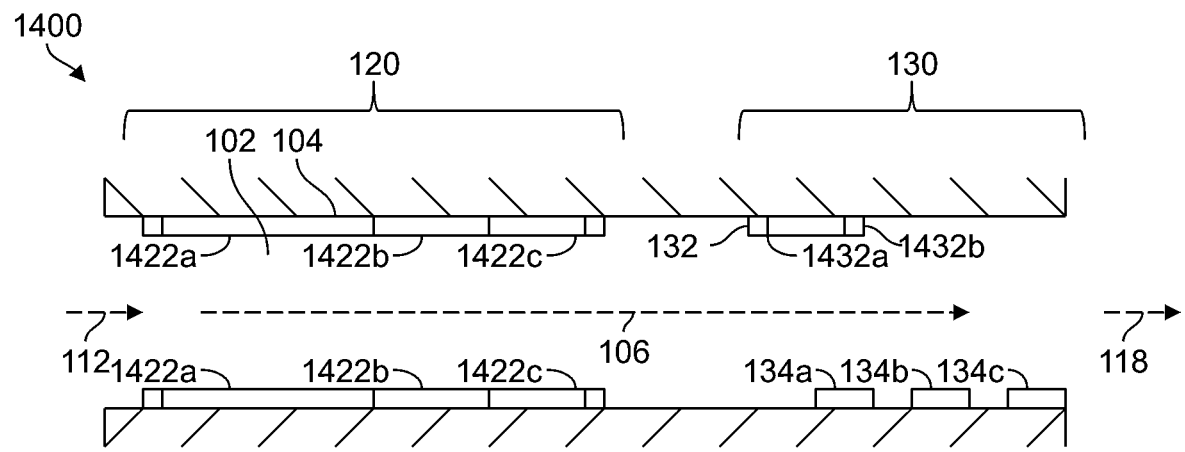
Figure 14C:
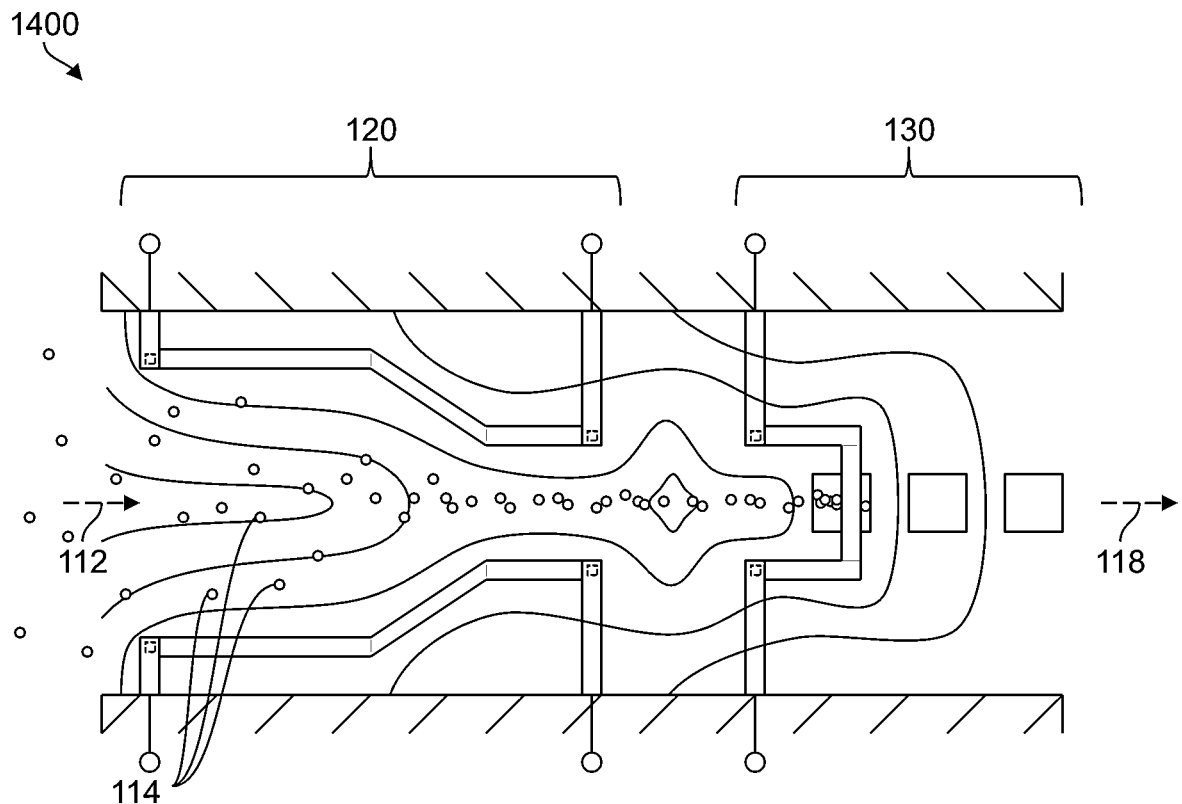
Figure 14D:
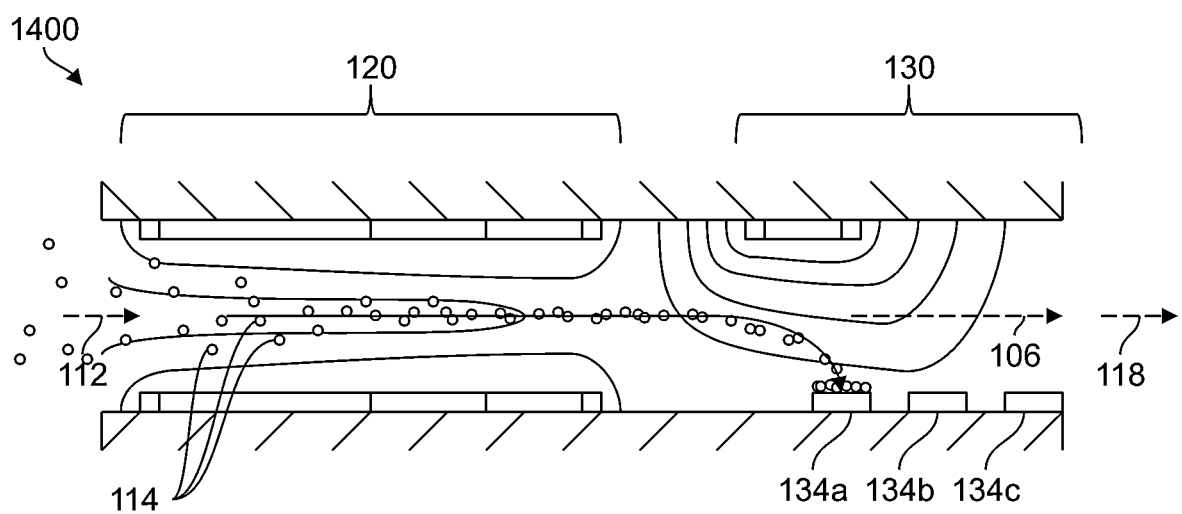
Figure 15A:
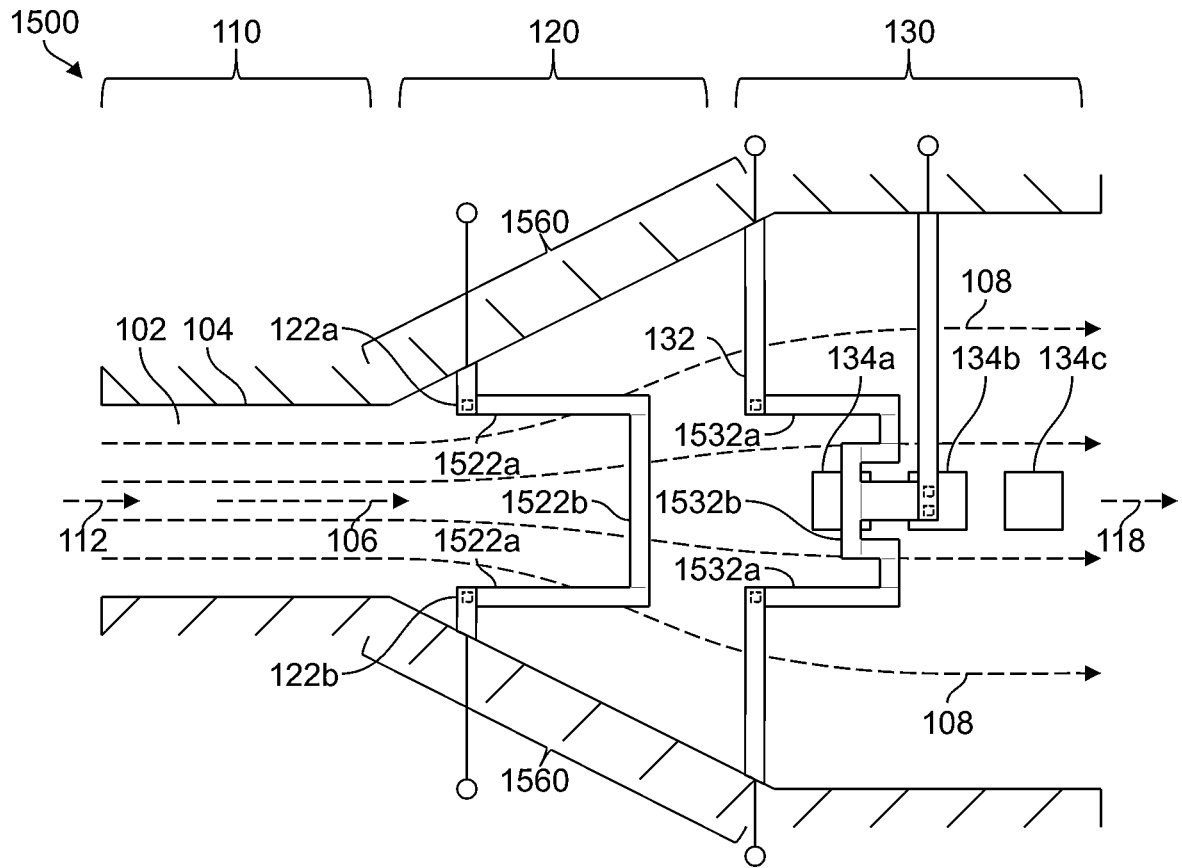
Figure 15B:
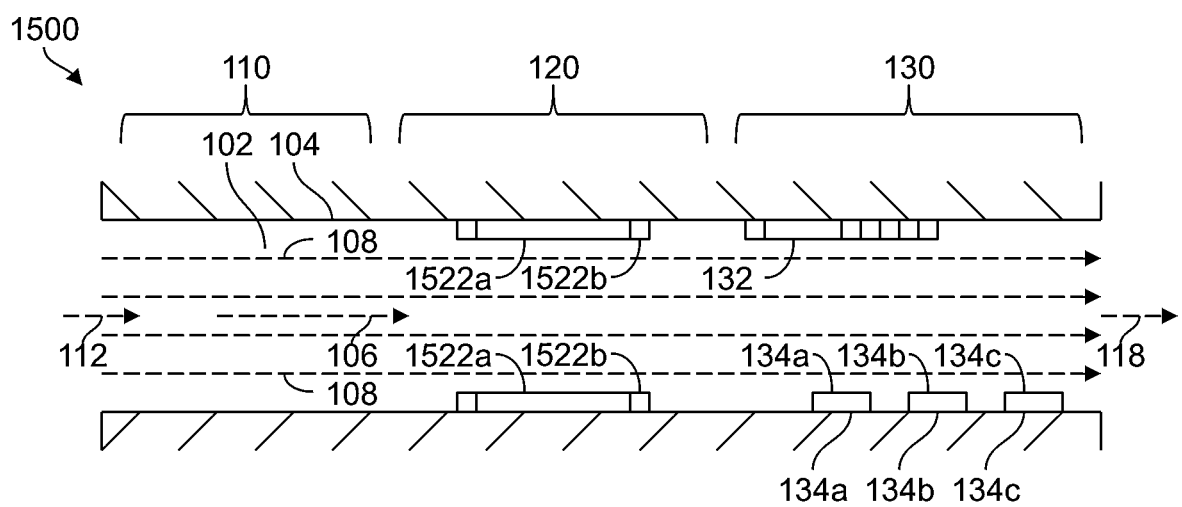
Figure 15C:
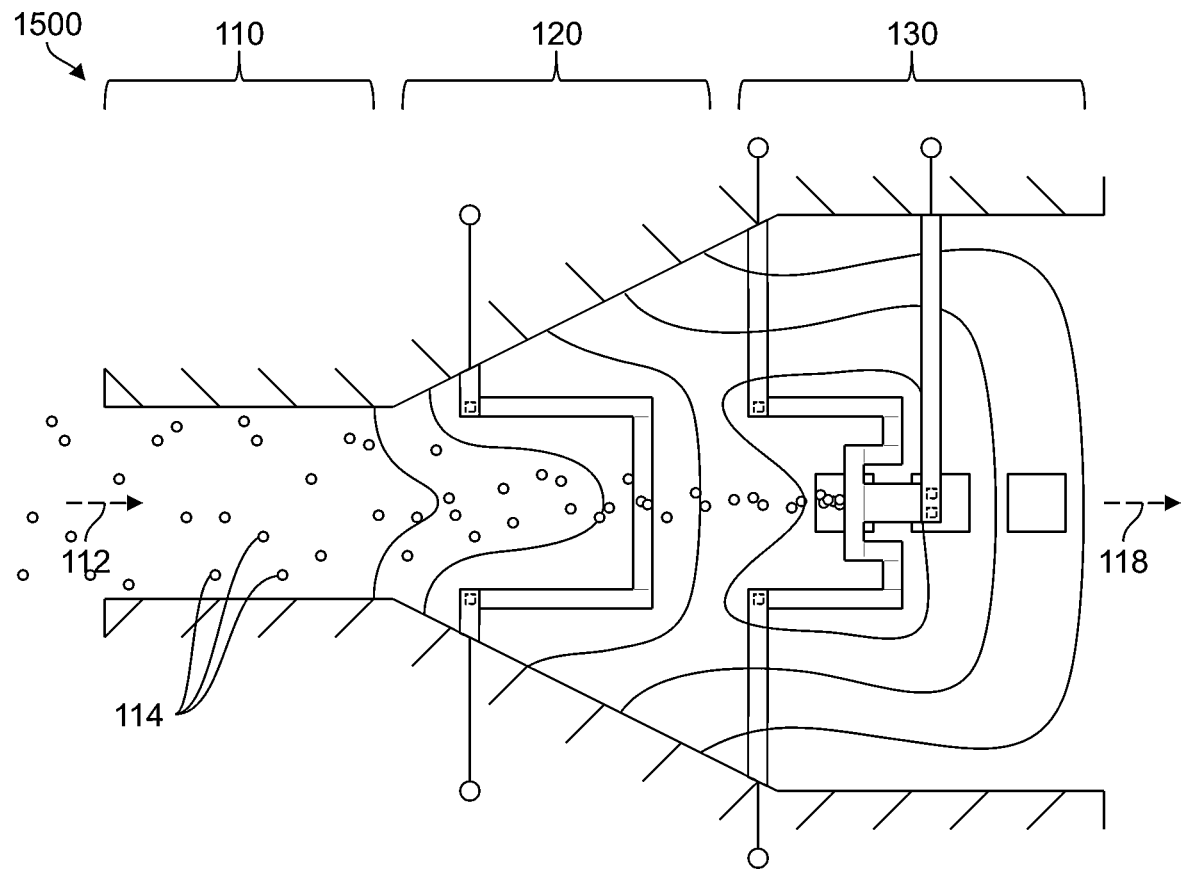
Figure 15D:
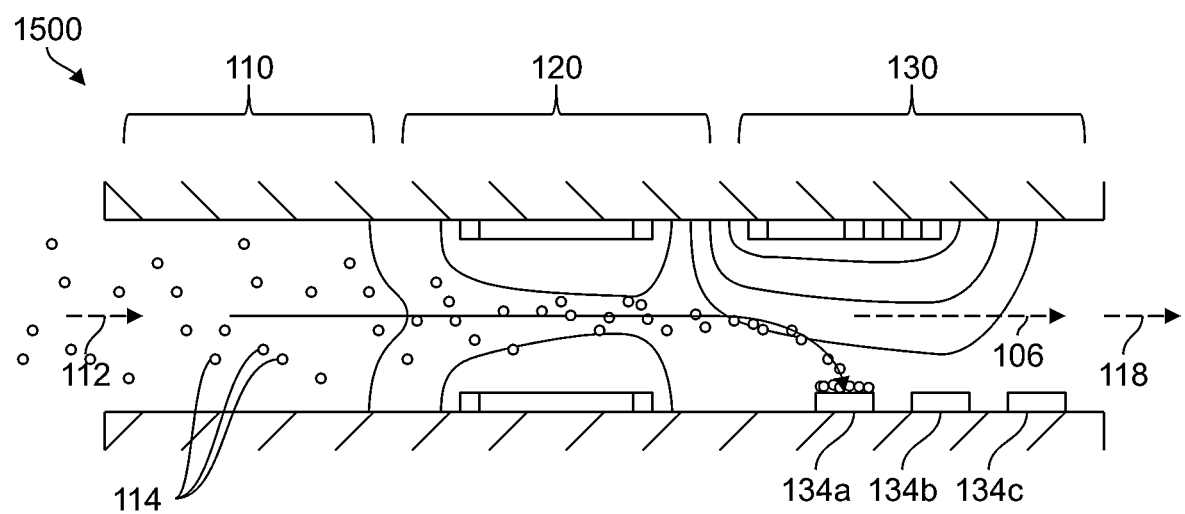

As shown in FIG. 11B, particles 1152, 1154, 1156 and 1158 with increasing particle size are thermophoretically forced towards an interior region of the air stream 106 in the particle concentrator 120 and then are deflected away from the interior region of the air stream 106 in the particle discriminator 130 towards a periphery of the air stream 106, with smaller particles undergoing greater deflection than larger particles. In FIG. 11B, smallest particle 1152' is deflected and strikes a wall 104 of the particle discriminator 130 before the particle detector 134; small particle 1154' strikes and is collected on a surface of the particle detector 134; large particle 1156' is not collected by the particle detector 134 and continues in the air stream 106; and largest particle 1158' continues in the air stream 106 with less deflection than smaller particles.

FIGS. 12A-12B illustrate a top view and a side view of a system 1200 for analyzing particles in an air stream 106. System 1200 includes an inlet 110, a thermophoretic particle concentrator 120 and a thermophoretic particle discriminator 130. The thermophoretic particle concentrator includes an air channel 102 between channel walls 104 having a first open end for an inlet air stream 112 and a second open end for an outlet air stream 118. The air channel 102 is enclosed by channel wall 104 extending from at least the first open end to the second open end. Two or more heater elements 122*a*, 122*b* may be positioned between the first open end and the second open end and are positioned near a periphery of the air channel 102. A cross-section of the air channel 102 and channel wall 104 perpendicular to the air stream 106 is rectangular, and at least two heater elements 122*a*, 122*b* are positioned on two opposing sides of the channel wall 104. The heater segments 1222*a* of heater elements 122*a*, 122*b* extend along the channel wall 104 in a direction substantially parallel to the air stream 106. The particle discriminator 130 including one or more heater elements 132 and particle detectors 134 is coupled to the air channel 102 in a direction downstream from the particle concentrator 120.

FIGS. 13A-13B illustrate a perspective view and a side view of a system 1300 for analyzing particles. System 1300 includes an inlet 110, a thermophoretic particle concentrator 120 and a particle discriminator 130. Thermophoretic particle concentrator 120 includes a pair of thermophoretic heater elements 122a, 122b positioned near a periphery of an air channel 102. The thermophoretic heater elements 122a, 122b are configured to thermophoretically force airborne particles in the air channel 102 away from the periphery and towards an interior region of the air channel 102 and air stream 106. The channel walls 104 and the cross-sectional geometry of the air channel 102 may be rectangular. Channel walls 104 include portions of a lower wall 1312, side walls 1314, 1316 and upper wall 1318. The perspective view shown in FIG. 13A has the upper wall 1318 removed for clarity. An inlet air stream 112 enters an opening in the channel walls 104 upstream of the particle concentrator 120 and exits an opening in the channel walls 104 downstream of the particle discriminator 130. The thermophoretic heater elements 122a, 122b may include one or more heater wires 1322a, 1322b, 1322c suspended in the air channel 102 with heater posts 1326a, 1326b. In some implementations, the heater wires 1322a, 1322b, 1322c may be formed into a wire mesh. Alternatively, heater elements 122a, 122b may be constructed of thin, partially conductive films on the interior surfaces of electrically insulated channel walls, ceilings, and floors. Electrical current may be sent through heater wires 1322a, 1322b, 1322c to generate the desired thermal gradient.

One or more of the heater wires 1322a, 1322b, 1322c of heater elements 122a, 122b may be angled with respect to the air channel 102 in an inward direction along the air channel 102 and towards an interior region of the air stream 106. The thermophoretic heater elements 122a, 122b are configured to thermophoretically force airborne particles in the air channel 102 away from the periphery and towards an interior region of the air channel 102 and air stream 106. The thermophoretic heater elements 122a, 122b allow focusing of particles in the inlet air stream 112 into a tighter beam of particles with higher particle concentration. Some of the dimensions of the air channel 102 in the region of the particle concentrator 120 may be narrowed to further direct the particles into a narrower beam.

System 1300 includes a particle discriminator 130 with at least one heater element 132 and at least one particle detector 134 positioned on a lower wall 1312 downstream of the particle concentrator 120 to collect and detect particles in the air stream 106. Heater element 132 may include a heater wire 1332 suspended in the air channel 102 with heater posts 1336a, 1336b. The dimensions of the walls 104 within the particle discriminator ** divergent particles 114 near the center of the air channel 102 and to deflect the particles 114 onto one or more particle detectors 134a, 134b, 134c within the particle discriminator 130. In some implementations, the heater segments 132a, 132b of heater element 132 may be configured as a sideward "V" to corral particles in the air stream 102 and to deflect the particles onto the particle detectors 134a, 134b, 134c. In some implementations, the heater segments 1532a, 1532b may comprise a plurality of serpentine segments to increase the resistance of the heater element 132 and increase the heater voltage applied across the heater element 132.

Figure 16:
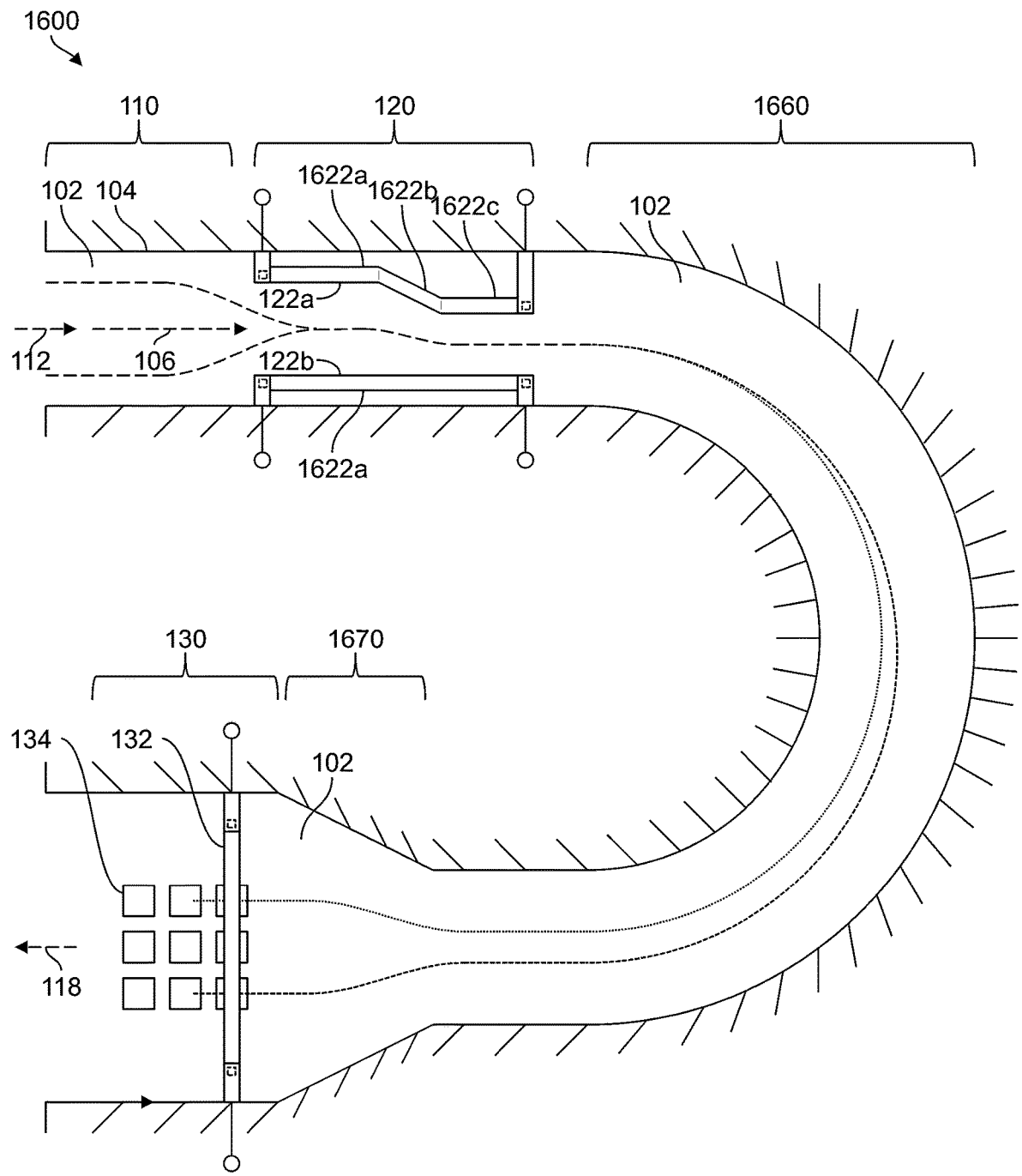

The application of an external force such as centripetal force, can, in some implementations, be used to improve the ability to differentiate and discriminate between different particle sizes. FIG. 16 illustrates a top view of a system 1600 for analyzing particles in an air stream 106 including a centrifugal particle separator stage 1660. Particles 114 entering system 1600 in an inlet air stream 112 traverse inlet 110, particle concentrator 120, and centrifugal particle separator stage 1660 having a curved air channel 102 positioned between the particle concentrator 120 and a particle discriminator 130. Particles in the air stream 106 may be spatially separated with smaller, lighter particles staying near an inside of the air channel 102 and larger, heavier particles moving towards an outer portion of the centrifugal particle separator stage 1660. The particle discriminator 130 may include a one- or two-dimensional array of particle detectors 134 configured to detect spatially separated particles from the centrifugal particle separator stage 1660. The system 1600 may further include an airflow expansion stage 1670 positioned between the centrifugal particle separator stage 1660 and the particle discriminator 130. The airflow expansion stage 1670 may have an air channel 102 that widens as the air stream 106 traverses the airflow expansion stage 1670. Particles spatially separated in the centrifugal particle separator stage 1660 may be further separated in the airflow expansion stage 1670 as streamlines within the airflow expansion stage 1670 diverge. Additionally, the air channel 102 within the airflow expansion stage 1670 may widen to slow the air velocity and particle velocity in the air stream 106 as the air stream 106 traverses the airflow expansion stage 1670 to allow more time for thermophoretic forces to act on and deflect the particles.

Prior to entering the centrifugal particle separator stage 1660, particles may be concentrated in an interior region that is somewhat offset from a centerline of the air channel 102 in the centrifugal particle separator stage 1660. The thermophoretic particle concentrator 120 may have heater elements 122a, 122b with heater segments 1622a, 1622b, 1622c configured to force particles in the air stream 106 towards an interior region that is offset from the centerline of air channel 102 within the particle concentrator 120 to utilize more of the air channel 102 in the centrifugal particle separator stage 1660. To force particles towards an interior region offset from the centerline, heater segments 1622a and 1622c may be extended in a direction parallel to the air channel 102 and air stream 106 with heater segment 1622c positioned closer to a centerline of the air channel 102 in the particle concentrator 120 and heater segment 1622b extended in a direction that is angled with respect to the air stream 106.

Figure 17A:
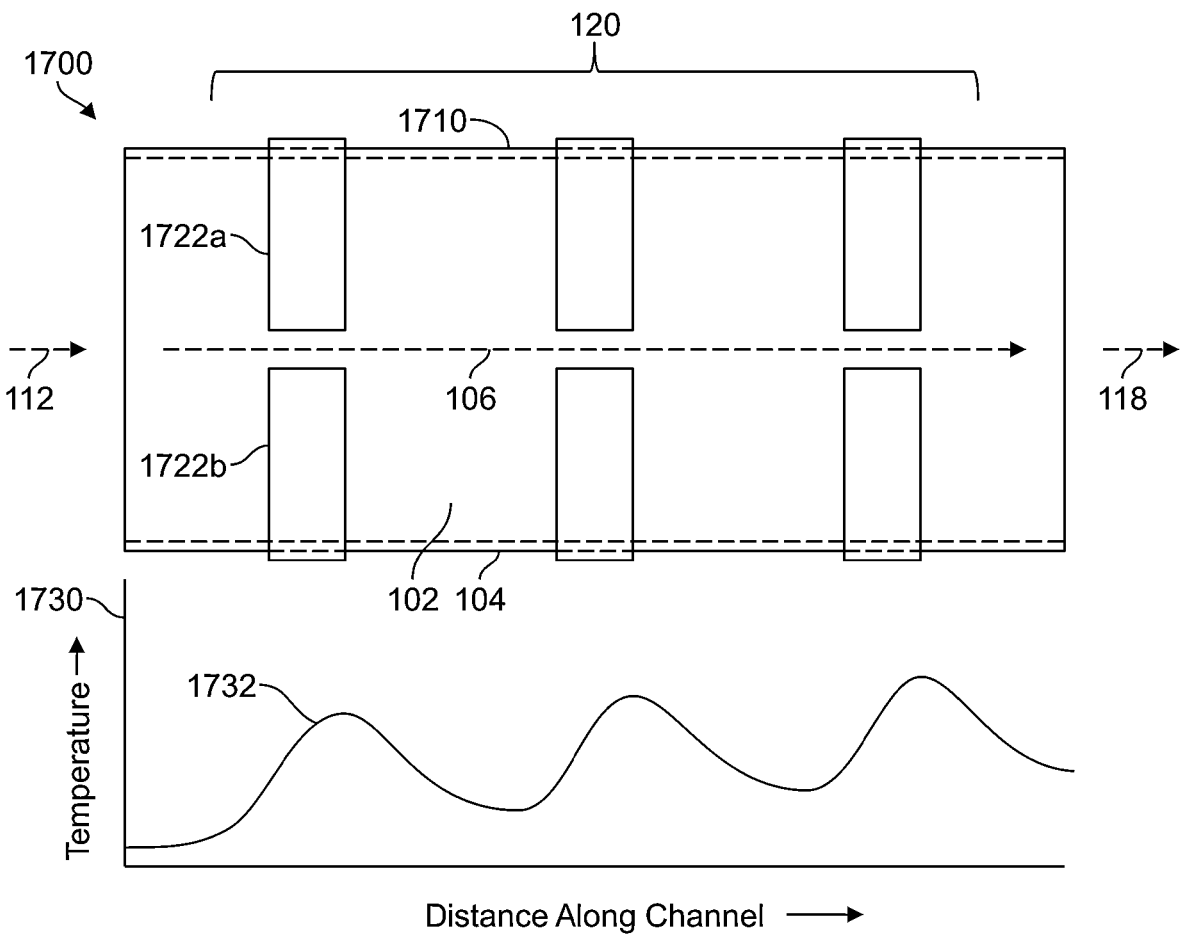
Figure 17B:
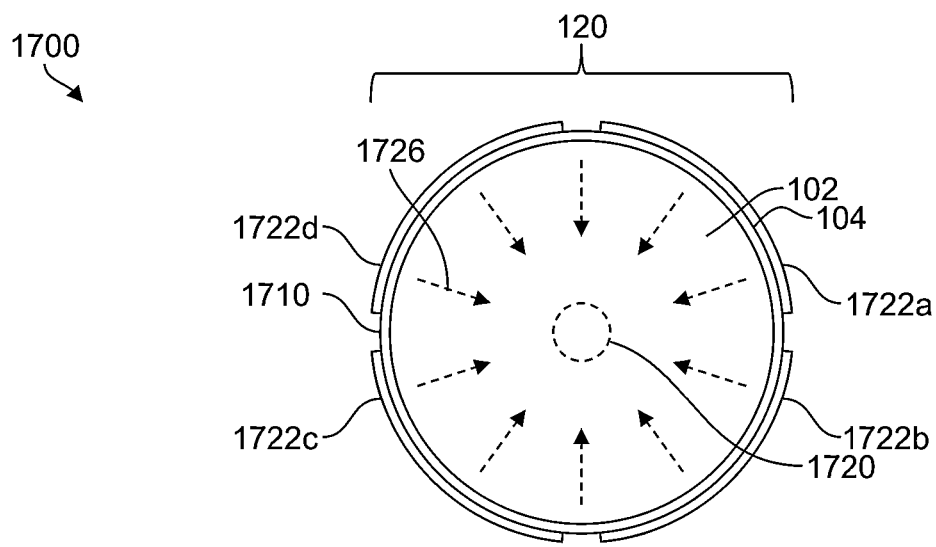

FIGS. 17A-17B show a side view and an axial view of a thermophoretic particle concentrator 1700 having a circular cross-sectional geometry. The particle concentrator 120 has an air channel 102 with a first open end providing for an inlet air stream 112 and a second open end providing for an outlet air stream 118. The air channel 102 may be enclosed by a channel wall 104 extending from at least the first open end to the second open end. The cross section of the air channel 102 and the channel wall 104 perpendicular to the air stream 106 are circular. Heater elements 1722a, 1722b, 1722c, 1722d are positioned between the two open ends and near a periphery of the air channel 102. Heater elements 1722a, 1722b, 1722c, 1722d are positioned along a circumference of the channel wall 104 in a direction substantially perpendicular to the air stream 106. The heater elements 1722a, 1722b, 1722c, 1722d are configured to thermophoretically force particles in the air stream 106 away from the periphery of the air channel 102 and towards an interior region 1720 of the air channel 102 when heated and thermal gradients emanating from the heater elements 1722a, 1722b, 1722c, 1722d are generated.

In implementations with a substantially radial thermophoretic particle concentrator 120 that focuses particulate matter into a beam, the outside perimeter or certain s wall 104. The temperature differential across the air channel 102 may generate thermophoretic forces 1726 that can propel particulate matter into a center beam of particles. The heater elements 1722a, 1722b, 1722c, 1722d may be driven at the same temperature, or may have different temperatures. In some implementations, a single composite heater may be used instead of an array. In some implementations, several sets of heater elements 1722a, 1722b, 1722c, 1722d may be positioned along the air channel 102. The distance between heater elements in the array may vary as a function of location along the air channel 102. In some embodiments, the array of heater elements 1722a, 1722b, 1722c, 1722d may contact each other. The temperature of a given heater element 1722a, 1722b, 1722c, 1722d may be constant with time, or change as a function of time in order to achieve time-dependent focusing.

Figure 18A:
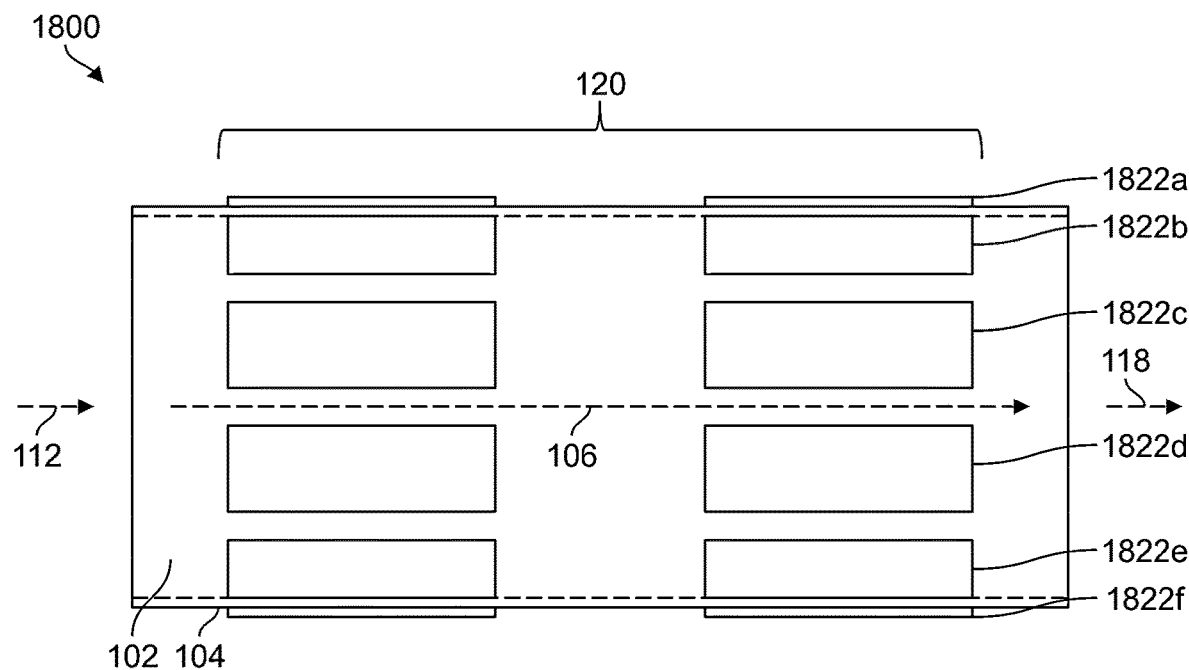
Figure 18B:
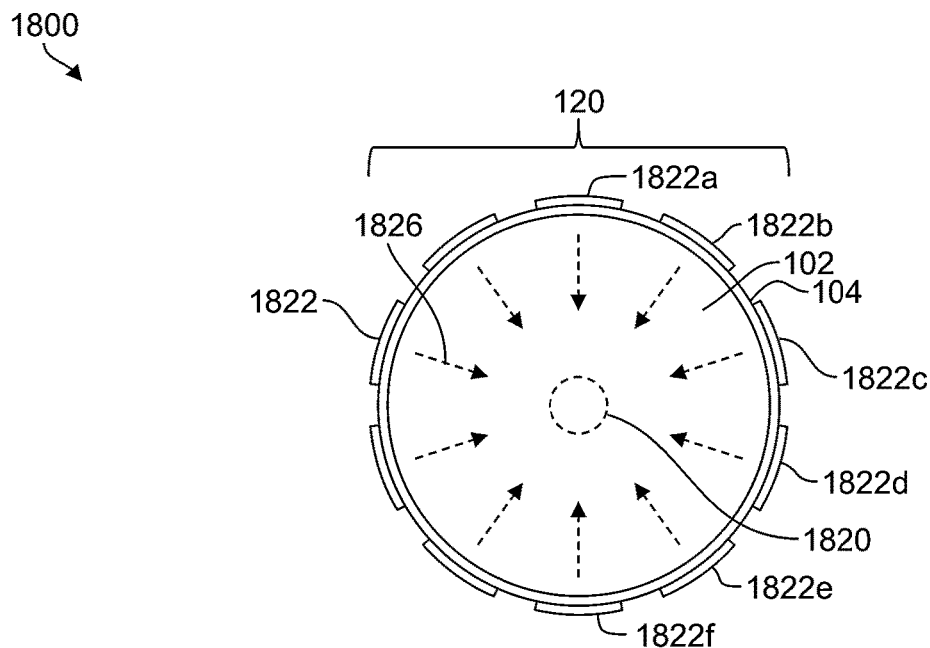
Figure 19A:
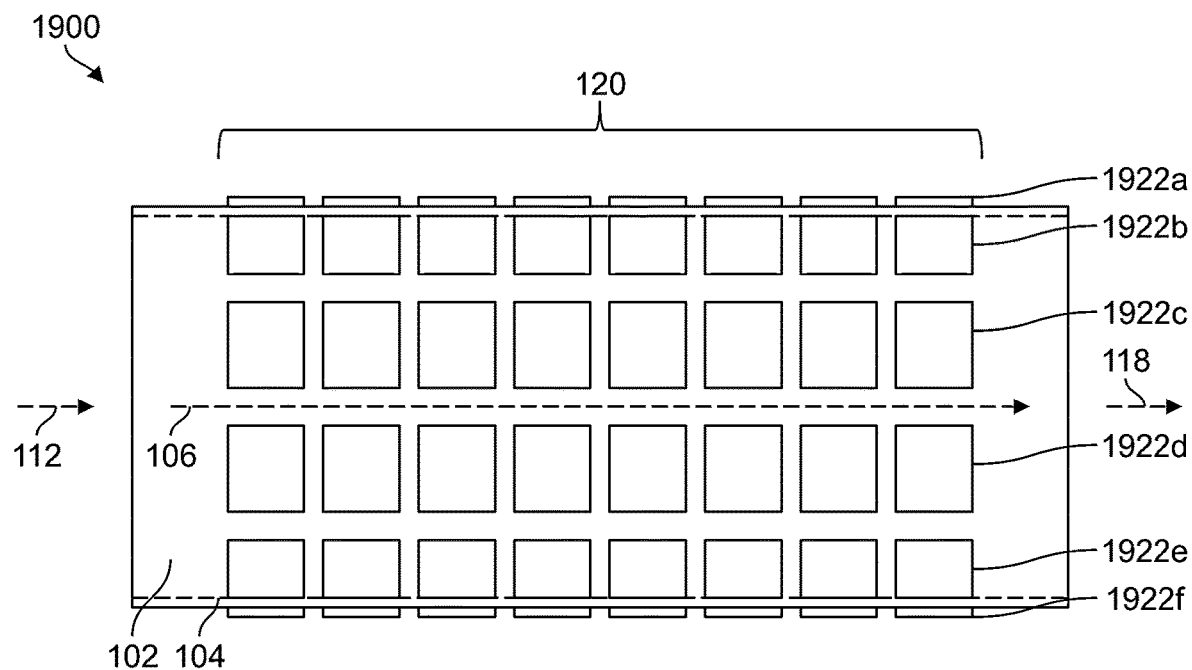
Figure 19B:
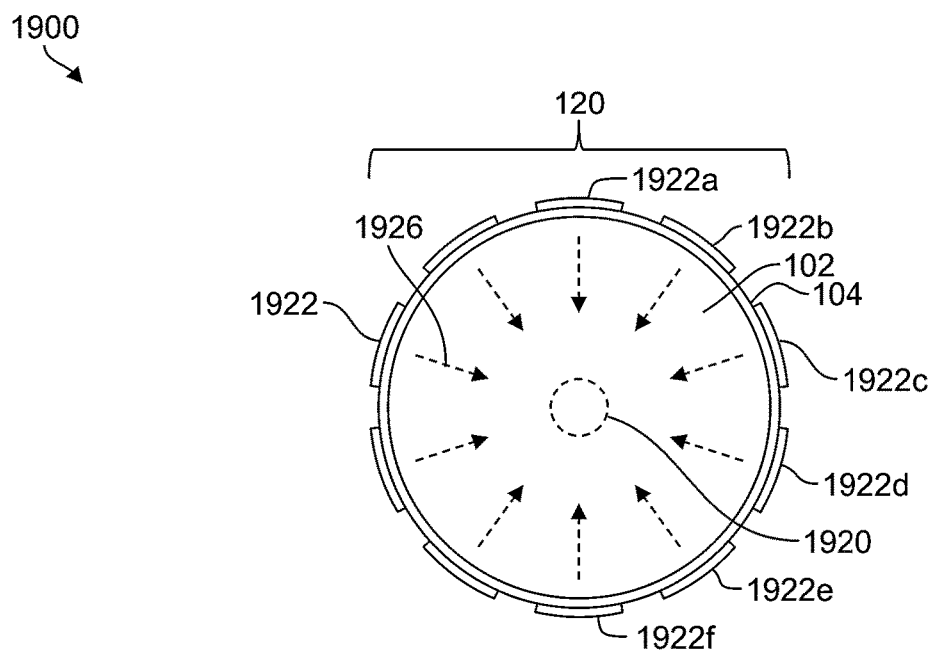
Figure 20A:
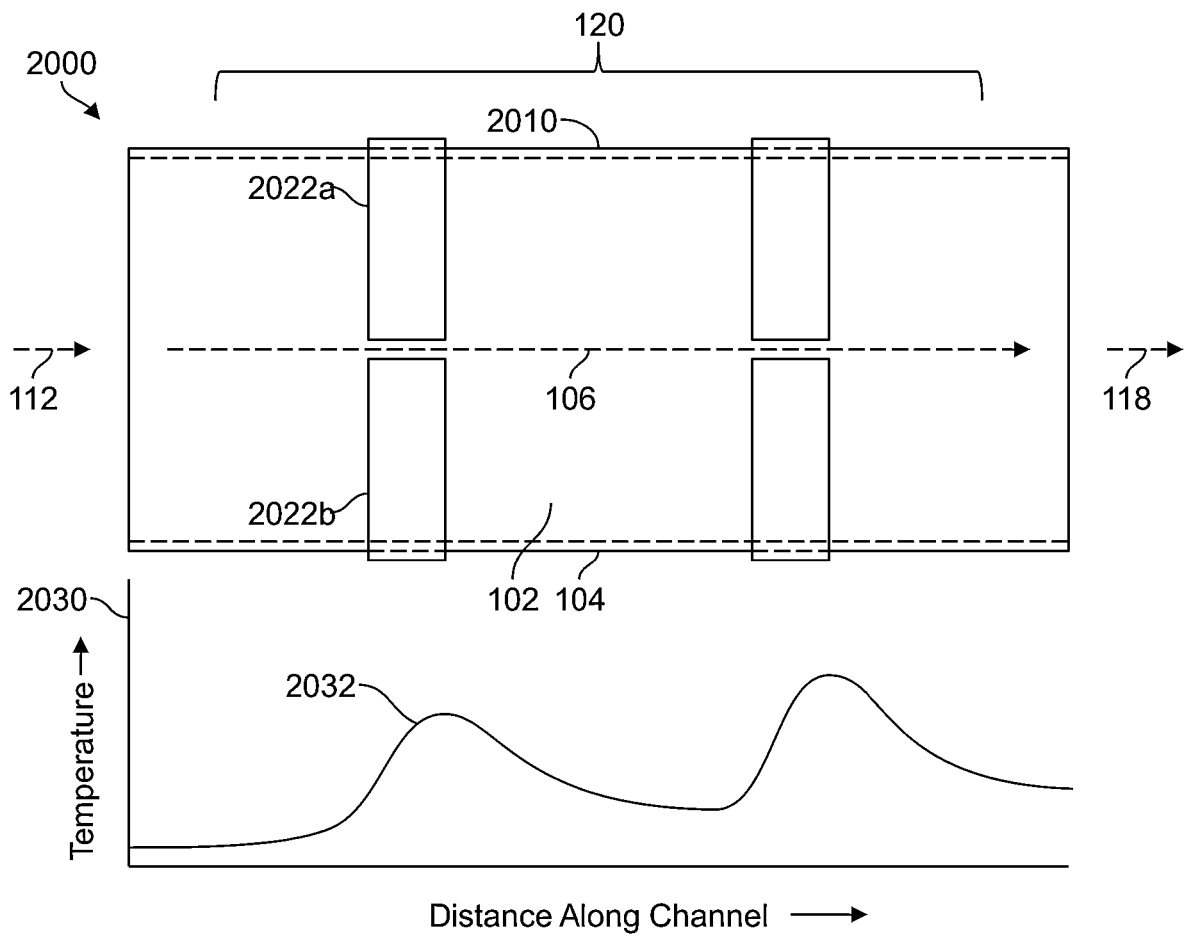
Figure 20B:
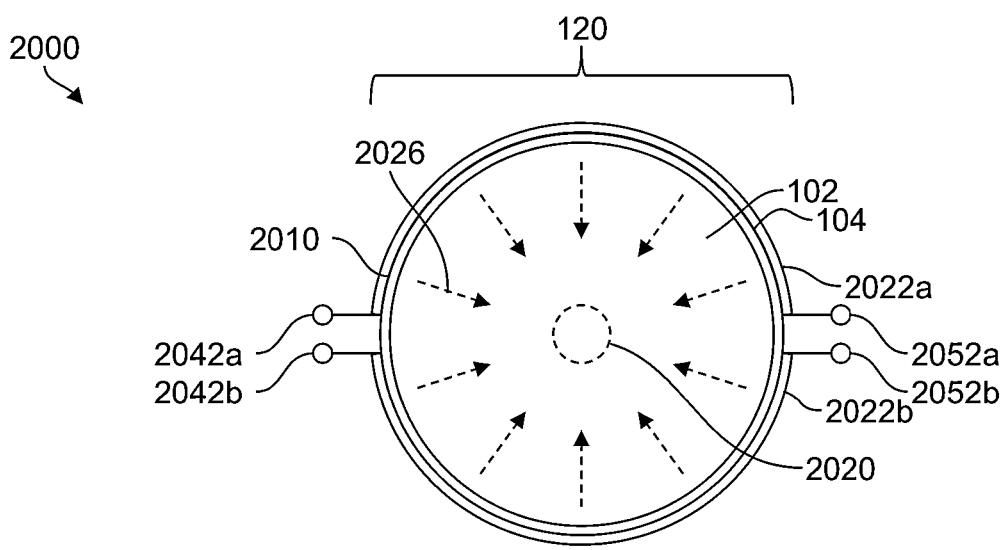
Figure 21A:
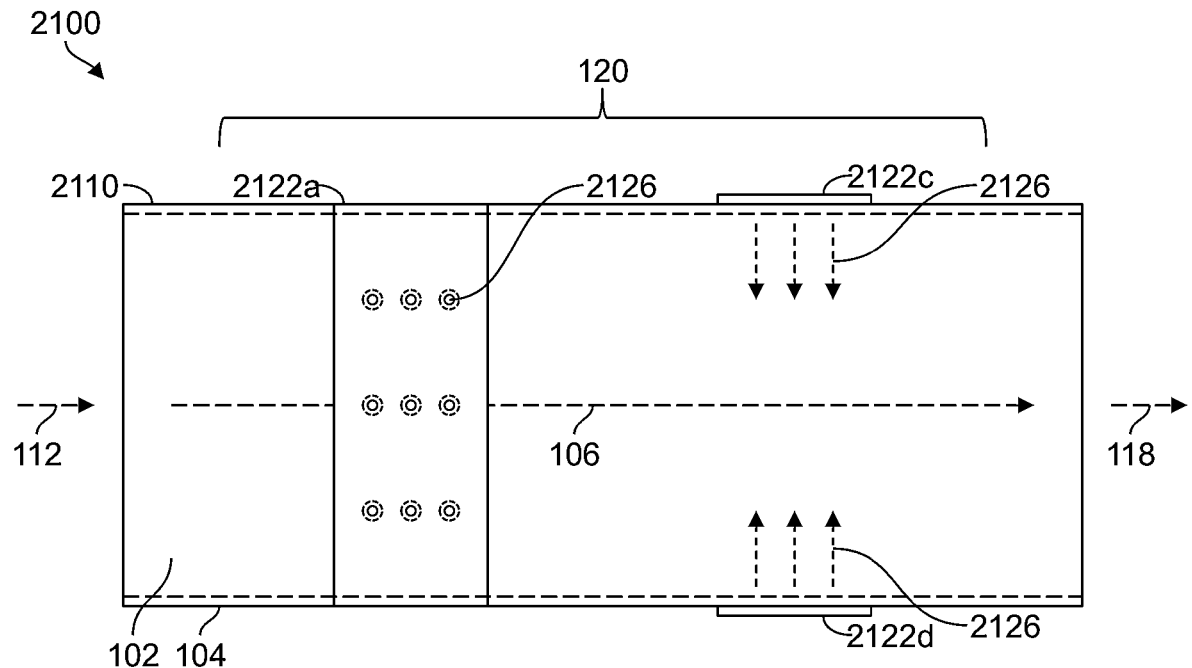
Figure 21B:
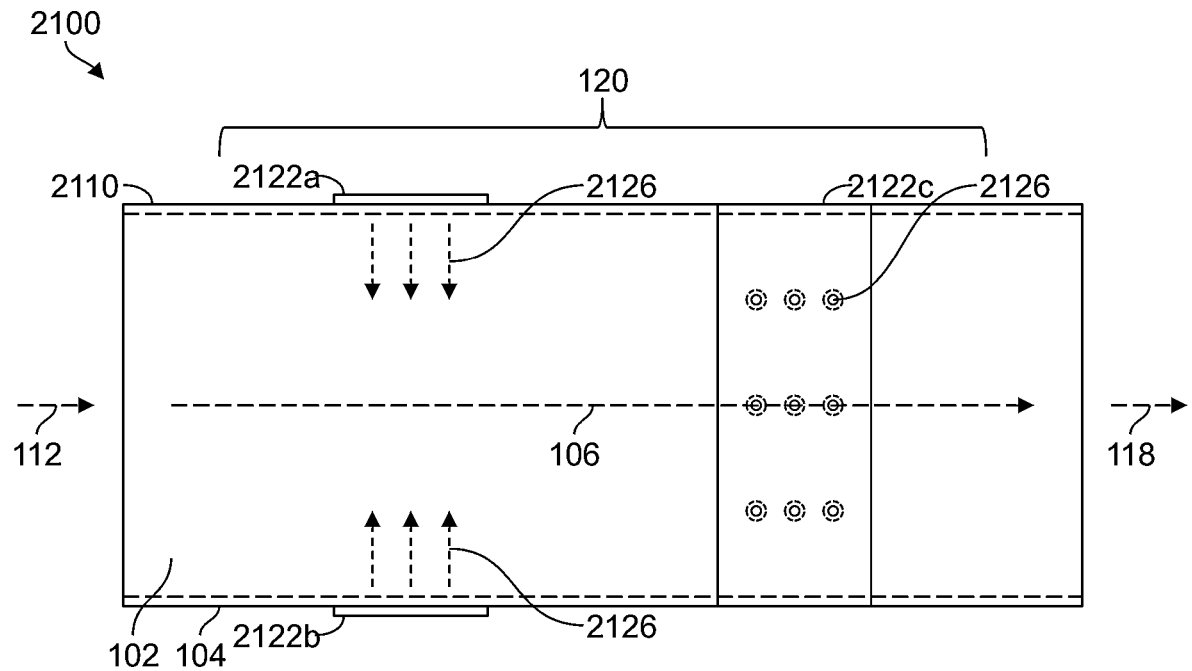

FIGS. 18A-18B show a side view and an axial view of a thermophoretic particle concentrator 120 having a circular cross-sectional geometry with heater elements extending in the direction of the air stream. The heater elements 1822a through 1822f among others may extend along the channel wall 104 in a direction substantially parallel to the air stream 106. When powered, heater elements 1822a through 1822f among others can generate thermal gradients within the air channel 102 and corresponding thermophoretic forces 1826 on particles in the air stream 106 traversing the air channel 102 within the particle concentrator 120 to concentrate the particles in an interior region 1820 of the air channel 102.

FIGS. 19A-19B show a side view and an axial view of a system for analyzing particles with a thermophoretic particle concentrator 120 having a circular cross-sectional geometry and individually addressable heater elements positioned along the outer perimeter and length of the particle concentrator 120. The heater element array may be individually addressable to achieve the desired temperature profile and to force the particulate matter into the center of the particle concentrator 120. An individually addressable array of heater elements 1922*a* through 1922*f* among others on a channel wall 104 surrounding an air channel 102 that contains an air stream 106 are configured to allow control of the temperature profile and thermal gradients within the air stream 106 flowing through the air channel 102. Power selectively applied to one or more of the heater elements in the addressable array allows selective control of thermophoretic forces 1926 applied to particles passing through the particle concentrator 120 and concentrating the particles in an interior region 1920 of the particle concentrator 120.

FIGS. 20A-20B show a side view and an axial view of a thermophoretic particle concentrator 120 having a circular cross-sectional geometry with heater elements extending around the circumference of the tubular particle concentrator 120. The heater elements 2022*a*, 2022*b* may be positioned on opposite sides of the circular channel wall 104 and extend along the channel wall 104 in a direction substantially perpendicular to the air stream 106. Heater elements 2022*a*, 2022*b* may include provision for electrical connections 2042*a*, 2052*a* and 2042*b*, 2052*b*, respectively. Heater elements 2022*a*, 2022*b* may be electrically connected in series or parallel to form combined heater elements 2022*a*, 2022*b* that are nominally continuous and extend nearly all around the circumference of channel wall 104. Additional sets of heater elements 2022*a*, 2022*b* may be positioned at other places along the channel wall 104 to provide additional capability to focus and concentrate particles in an interior region 2020 of the thermophoretic particle concentrator 120. Plot 2030 showing an exemplary temperature profile 2032 along the air stream 106 within the air channel 102 with higher temperatures occurring near the heater elements and lower temperatures occurring away from the heater elements, with concomitant thermal gradients and thermophoretic forces for focusing or concentrating particles within the particle concentrator 120.

In some implementations, a thin metal film may be deposited onto the interior wall of an insulating tube with appropriate dimensions and an electrical current run through the film to generate the thermal gradients in a thermophoretic particle concentrator. In some implementations, an elongated tube may be electroplated with a metal layer on the interior surface of the tube that is thinner in some sections and thicker in other sections so that when electrical current is applied the thinner sections will heat up to a higher temperature than the thicker segments to generate a thermal profile similar to that in plot 2030. In some implementations, one or more turns of a heater wire or heater strips may extend around the circumference of the air channel 102. Sets of heater wires or heater strips may be placed at various places along the length of the thermophoretic particle concentrator 120 to achieve the temperature profile shown in plot 2030.

In some implementations, particulate matter may be focused through the use of successive substantially planar thermophoretic particle concentrators. FIGS. 21A-21B show a top view and a side view of a thermophoretic particle concentrator 120 having a rectangular cross-sectional geometry. A first set of heater elements 2122*a*, 2122*b* are positioned on two opposite sides of the channel wall 104, extending in a direction along the channel wall 104 that is substantially perpendicular to the air stream 106. A second set of heater elements 2122*c*, 2122*d* are positioned on the other two opposite sides of the channel wall 104 perpendicular to the air stream 106. The first set of heater elements 2122*a*, 2122*b* and the second set of heater elements 2122*c*, 2122*d* may be spaced apart along the air channel 102, as shown. In other configurations, the first and second set of heater elements 2122*a*, 2122*b*, 2122*c*, 2122*d* may be collocated around the air channel 102, forming a rectangular ring around a portion of the air channel 102. Opposing surfaces of the air channel 102 may be heated to generate a net force on particulate matter directed towards a mid-plane of the air channel 102. The first set of heater elements 2122*a*, 2122*b* may be configured to concentrate incoming particles in a first plane between the heater elements 2122*a*, 2122*b*. The second set of heater elements 2122*c*, 2122*d* may be configured to concentrate the particles in a second plane between the elements 2122*c*, 2122*d* that is perpendicular to the first plane, resulting in a concentrated beam of exiting particles. One or more sets of heater elements 2122*a*, 2122*b* and heater elements 2122*c*, 2122*d* may be positioned along the channel wall 104 in the thermophoretic particle concentrator 120 to further focus and concentrate the particles. In some implementations, a single pair of heater elements 2122*a*, 2122*b* may be present to focus particulate matter in a single plane between the heater elements 2122*a*, 2122*b*.

In some implementations, other geometric configurations may be employed in which sets of opposing thermophoretic forces act to focus or increase the volumetric concentration of particulate matter in the air stream. In some implementations, the heater elements or the temperature profiles may be configured to offset the focused particulate matter from an axis of symmetry in the air channel. For example, for a pair of heater elements on opposite sides of the air channel, one heater element may be driven to a higher temperature than the other heater element. In some implementations, the electrical power applied to the opposing pair of heater elements may change with respect to time to dither the position of focused particulate matter across the cross-section of the air channel.

Figure 22A:
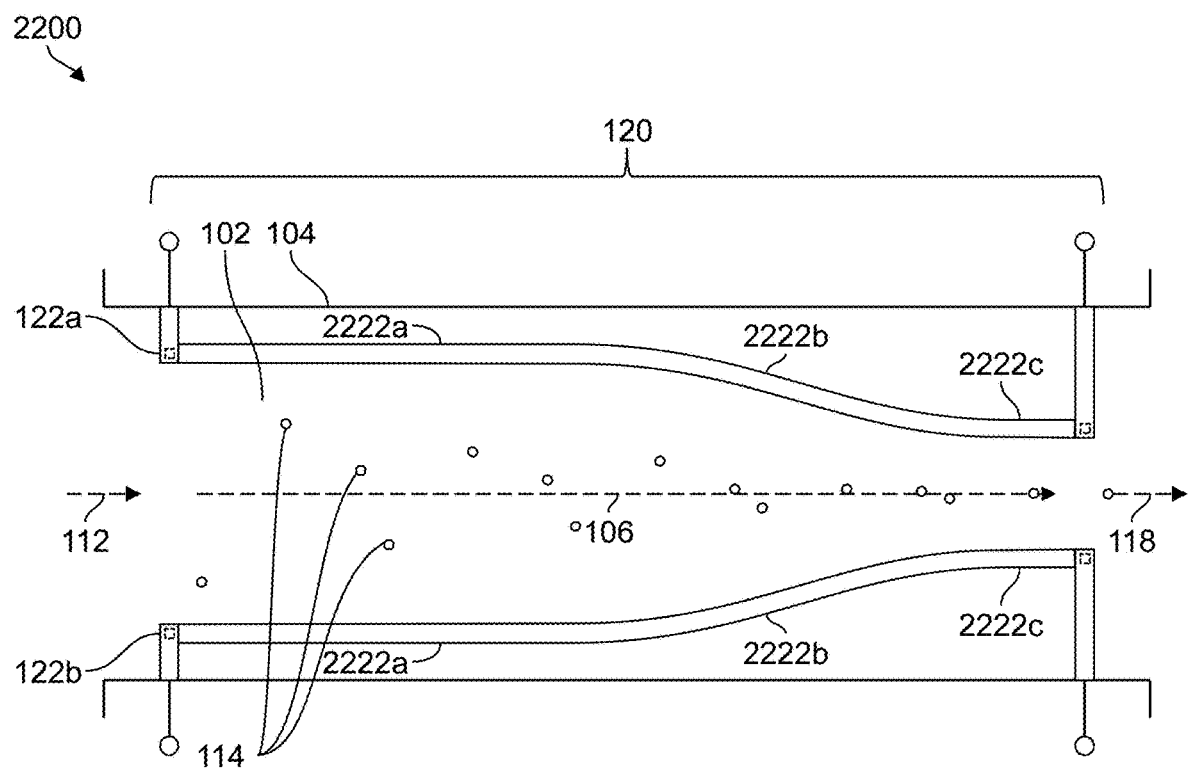
Figure 22B:
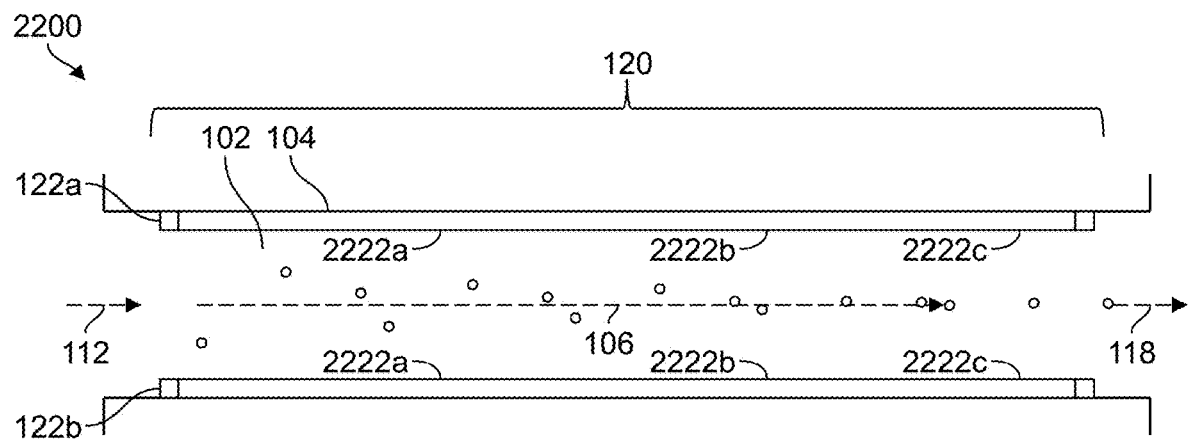

FIGS. 22A-22B illustrate top and side views of a thermophoretic particle concentrator 120 having a rectangular air channel 102 with smoothly tapered heater elements 122a, 122b for concentrating particles 114 in an air stream 106. The air stream 106 enters the air channel 102 from an inlet air stream 112, traverses through the thermophoretic particle concentrator 120, then exits through an outlet air stream 118. Particle concentrator 120 of system 2200 includes a pair of heater elements 122a, 122b positioned on one side of the air channel 102 and another pair positioned on the opposite side of the air channel 102. Each heater element 122a, 122b may have multiple heater segments 2222a, 2222b, 2222c with some heater segments angled or tapered and others straight with respect to the air channel 102. Particles 114 traversing the air channel 102 may be concentrated in an interior region of air stream 106 within the thermophoretic particle concentrator 120.

Figure 23A:
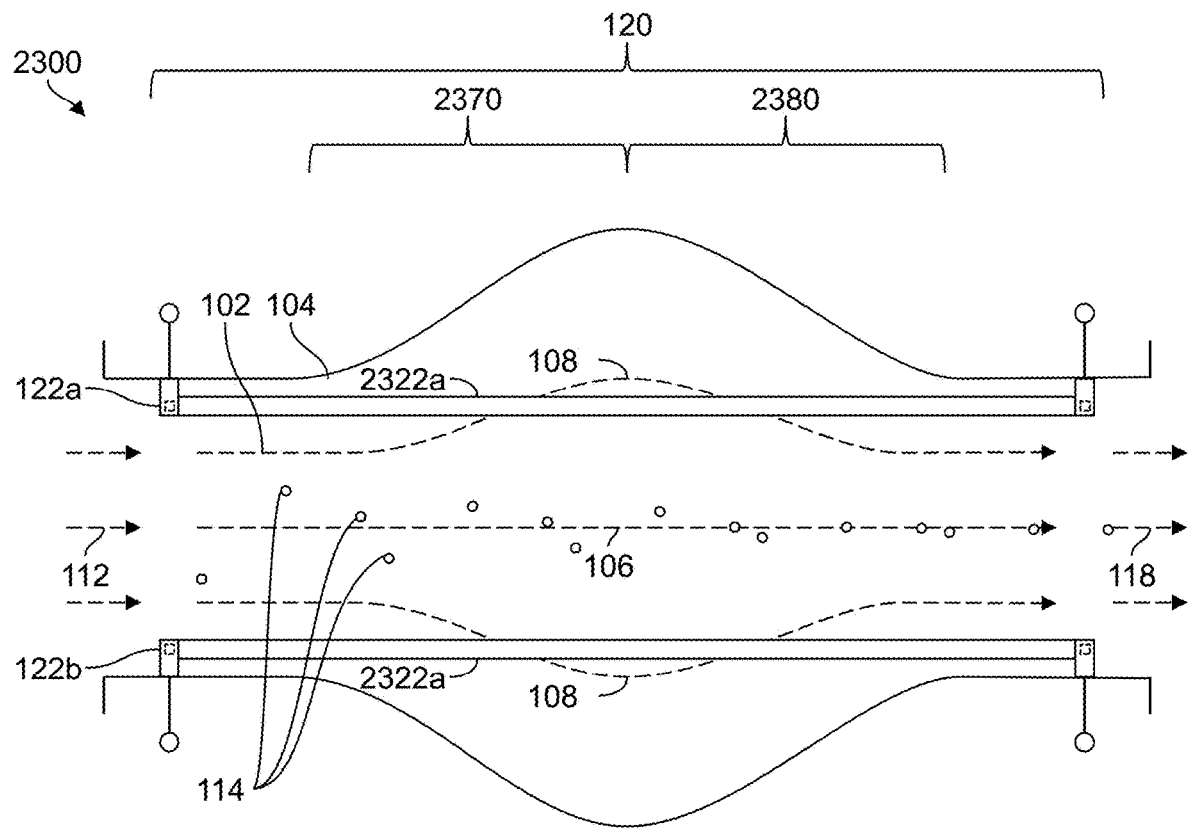
Figure 23B:
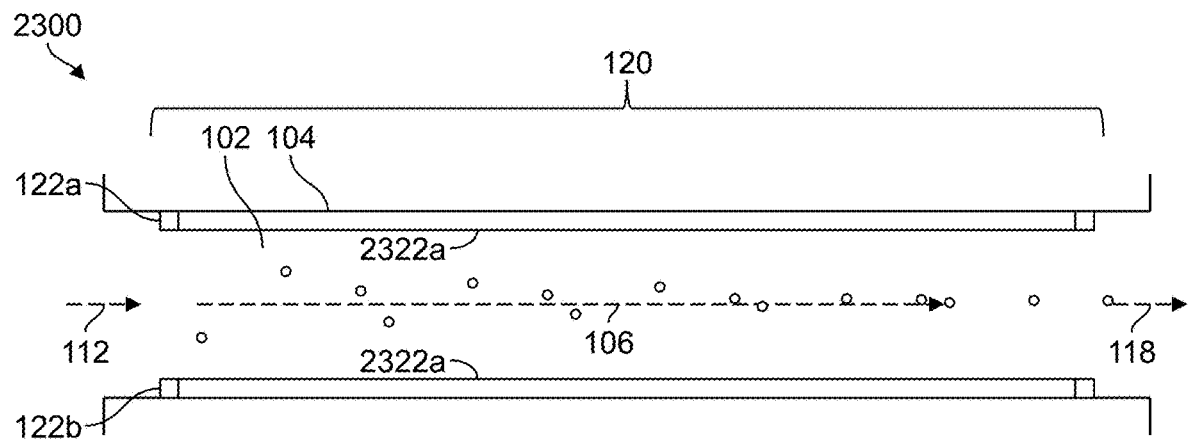

FIGS. 23A-23B illustrate top and side views of a thermophoretic particle concentrator 120 having a rectangular air channel 102 with varying cross-sectional geometry including an expansion stage 2370 and a compression stage 2380 for mechanically and thermophoretically concentrating particles 114 in an air stream 106 and to increase the particle concentration efficiency per unit channel length. The air stream 106 may enter the air channel 102 from an inlet air stream 112, traverse the expansion stage 2370 and the compression stage 2380 of the thermophoretic particle concentrator 120, and then exit through an outlet air stream 118. Particle concentrator 120 of system 2300 may include a pair of heater elements 122a, 122b having relatively straight heater segments 2322a, 2322b positioned on one side of the air channel 102 and another pair positioned on the opposite side of the air channel 102. Particles 114 traversing the air channel 102 may be thermophoretically forced towards an interior region of the air stream 106 within the expansion stage 2370 even though the streamlines 108 may diverge within the stage. The particles 114 continue to be thermophoretically forced towards the interior of the air stream 106 within the compression stage 2380 while also being compressed by the convergence of streamlines 108 within the stage. Extensions of heater elements 122a, 122b on either side of the expansion stage 2370 and compression stage 2380 may aid in particle concentration within the air channel 102. A straight section of air channel 102 (not shown) may be positioned between the expansion stage 2370 and the compression stage 2380.

Figure 24A:
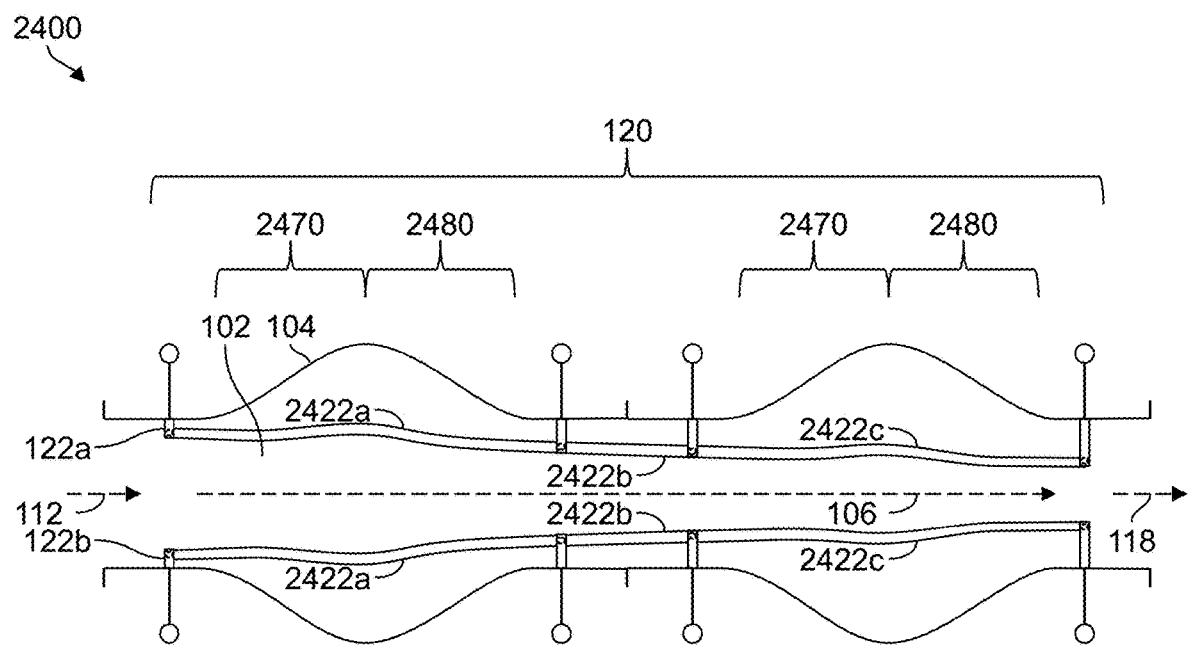
Figure 24B:
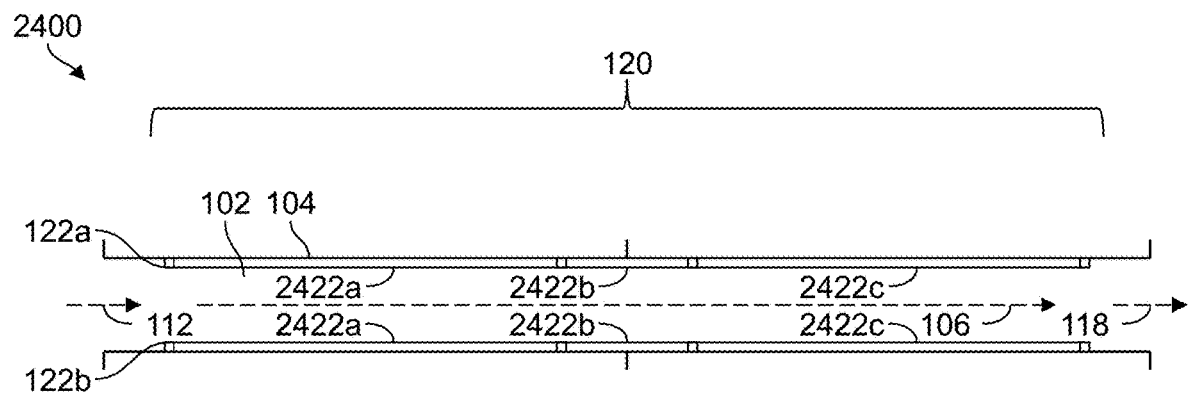

Multiple pairs of expansion stages 2470 and compression stages 2480 may be configured serially along the air channel 102 for an improved concentration of particles 114 in the air stream 106, as illustrated in the top and side views of a multi-stage particle concentrator 120 in FIGS. 24A-24B. Multiple pairs of expansion stages 2470 and compression stages 2480 allow concentration gains of each pair of stages to be combined. System 2400 with multi-stage particle concentrator 120 having multiple pairs of expansion stages 2470 and compression stages 2480 between the ends of the air channel 102 may include heater elements 122a, 122b with multiple heater taps for controlling the temperature within each stage. Heater segments 2422a, 2422b, 2422c of heater elements 122a, 122b may be straight, angled, curved or tapered to aid in effective particle concentration.

System 2400 with multiple pairs of expansion stages 2470 and compression stages 2480 may be configured with one or more curved sections (not shown) of air channel 102 that connect the pairs of expansion and compression stages. The curved sections allow the connected pairs of expansion and compression stages to wind back and forth for compactness while enhancing the concentration of particles within the air channel. The curved sections may be outfitted with one or more heater segments to retain and concentrate particles traveling through the outfitted curved sections.

Figure 25:
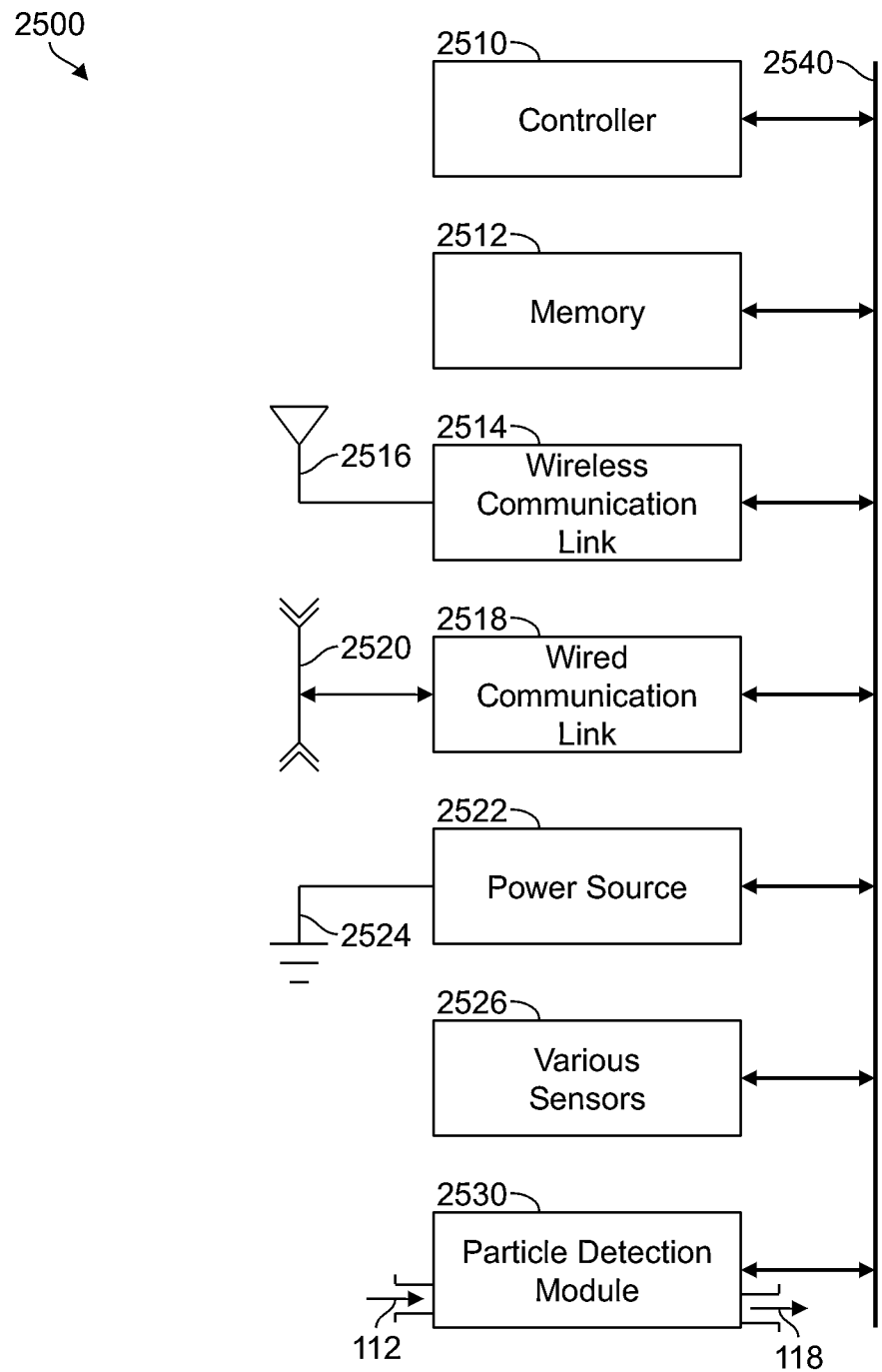

FIG. 25 illustrates a block diagram of a system 2500 for analyzing particles in an air stream. Particle detection system 2500 includes a controller 2510 with one or more processors and circuitry for running program code and executing instructions to analyze particles in an air stream among other functions. Controller 2510 may be connected via a communications bus 2540 to one or more memories 2512. Memory 2512 may include a combination of volatile and non-volatile memory for storing program instructions and data. Controller 2510 may communicate with other processors and data systems external to system 2500 via one or more wireless communication links 2514 and antennas 2516 or one or more wired communication links 2518 and external communication lines 2520 such as Ethernet or USB connections. One or more power sources 2522 and ground lines 2524 such as batteries or AC/DC power connections may provide local regulated power for devices connected to bus 2540. Various sensors 2526 and transducers such as temperature sensors, pressure sensors, humidity sensors, accelerometers, gyroscopes, ambient light sensors, clocks, microphones, and speakers may be connected to controller 2510 via communications bus 2540.

One or more particle detection modules 2530 for detecting particles in an air stream may include an inlet air stream 112 for incoming sample air and an outlet air stream 118 for outgoing air. The particle detection module 2530 may include one or more inlets, thermophoretic particle concentrators, and thermophoretic particle discriminators. The air stream within the particle detection module 2530 may be encompassed by the walls of an air channel extending from a first open end for the inlet air stream to a second open end for the outlet air stream. The particle detection module 2530 may be connected to controller 2510 via communications bus 2540 or other dedicated control and/or data lines. Controller 2510 may send control signals to control the power applied to various heater elements coupled to the air stream in the particle detection module 2530. Controller 2510 may be coupled to one or more air movement devices for controlling the movement of air through the air channel.

In some implementations, controller 2510 may provide one or more control signals to particle detection module 2530 to generate and adjust thermal gradients in the air stream. For example, thermal gradients in the air stream may be adjusted by adjusting power applied to one or more heater elements that generate the thermal gradient or by adjusting an airstream velocity of the air stream in the air channel.

Figure 26:
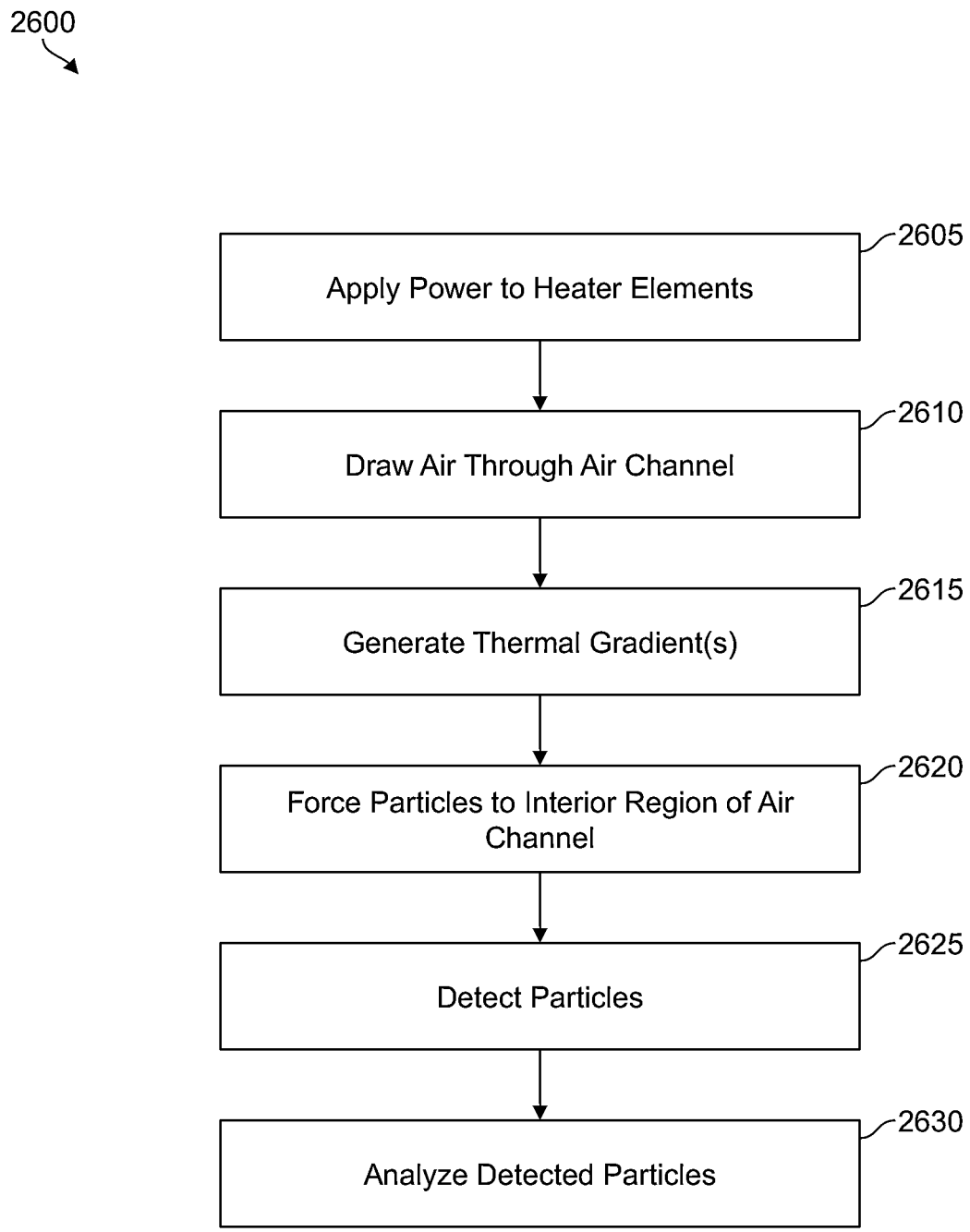

FIG. 26 shows a block diagram of a method 2600 for concentrating particles in an air stream and for analyzing particles in the air stream. The method 2600 includes applying power to heater elements positioned on various sides of an air channel encompassing at least a portion of the air stream, as shown in block 2605. Power may be applied to one or more pairs of heater elements that may be positioned near a periphery and on opposite sides of the air channel. In some implementations, the entire length of the air channel in the thermophoretic particle concentrator functions as a heater. In other implementations only short portions of the air channel function as a heater. In other implementations, sets or arrays of heater elements may be employed at certain sections of the air channel. These heater elements may operate at different temperatures and may be individually addressed in order to provide a high degree of flexibility in the generated thermal gradient.

In some implementations, power to the heater elements may be duty cycled (turned on and off) to extend the lifetime of system components. In many use cases, the time constant associated with any significant change in particulate matter concentration is on the order of tens of seconds to minutes or hours or more. Since air quality measurements may only be needed to be conducted once every few seconds or few minutes, or every few hours, there may be extended periods of time during which sampling of particulate matter may be turned off.

Air may be drawn through the air channel, as shown in block 2610. The drawn air may generate the air stream within the air channel. Air may be drawn through the air channel using any one of a variety of air movement devices such as a pump, blower, fan, turbine, motorized air intake device, bellows pump, membrane pump, peristaltic pump, piston pump, positive-displacement pump, rotary vane pump, Venturi device, airflow management device, or other air drawing means for moving or drawing air through the air channel. Drawing air through the air channel may be performed with a duty cycle corresponding approximately with the duty cycling of the heater elements.

Thermal gradients may be generated within the air channel, as shown in block 2615. Heat from electrical power applied to the heater elements combined with airflow profiles and air channel geometries generate one or more thermal gradients within the air channel, resulting in thermophoretic forces on particles in the air stream directed mainly towards the interior or center of the air stream.

Particles in the air stream may be forced away from the periphery of the air channel and towards an interior region of the air channel, by way of the thermophoretic force generated by the thermal gradient. This concentrates the particles in an interior region of the air stream, as shown in block 2620. Aerosol particles introduced into the inlet of the air channel may be distributed somewhat randomly throughout the cross-sectional area of the air stream. Action by the thermophoretic particle concentrator may reduce the physical cross-section and narrow the distribution of the particles flowing in the air stream as the air stream and the particles traverse the particle concentrator through the use of controlled thermal gradients. Particle concentration may be achieved through the use of opposing thermophoretic forces aligned with respect to one or more axes of the air channel.

The generated thermal gradients are dependent in part on the loss of heat into the air stream. The air stream in the air channel may exhibit a velocity gradient as a function of distance from the channel wall and length down the channel. Since the amount of heat removed is a function of the local velocity of air in the air stream, the generated thermal gradients are functionally dependent on the airstream velocity profile.

Method 2600 for concentrating particles in an air stream may be extended to encompass a method for analyzing particles in the air stream. Particles concentrated in the air stream may be detected, as shown in block 2625. In some implementations, particles may be detected by deflecting the particles with generated thermophoretic forces to direct particles in the air stream away from the interior region of the air channel and towards one or more particle detectors positioned on a wall of the air channel, where the particles may be collected on a surface of the particle detector and cause a change in a resonant frequency of the particle detector in response to the mass loading on the surface. In some implementations, the change in resonant frequency over a fixed time may be determined as an indication of the effective mass added onto the surface of the particle detector. In some implementations of particular benefit in environments with a large particulate matter concentration, an adaptive cycle may be used that measures the time to deposit particulate matter on a resonant-based particle detector for a predetermined frequency shift. The system may use at least one processor and be under software control so that when the air particle density is high, the unit may sample less frequently in order to extend the lifetime of the sensor.

In some implementations, the thermal gradients in either the particle concentrator or the particle discriminator may be modulated by modulating the power to the associated heater elements. Modulation of the thermal gradients may spread out the deposition of particles on the particle detectors to avoid non-uniform deposition and to extend the lifetime of the particle detectors.

The detected particles in the air stream may be analyzed, as shown in block 2630. One or more algorithms may be applied to detect the frequency shift of the resonant particle detector and to compensate for temperature effects. The algorithm may apply calibration coefficients and various model parameters to determine an effective mass of the particles collected on the surface of the particle detector and to generate an aerosol mass concentration estimate for the sampled air. In some implementations, the aerosol mass concentration may be estimated for one or more selected particle size ranges.

Although the various blocks and steps described in the above process flows and methods are intended to be representative, the steps and the order of the steps may be altered and still remain within the scope, spirit and claims of this disclosure. Variations in the steps and the order of the steps may be made without loss of generality, such as performing one step before another or combining two or more steps into one step.

While various implementations have been described above, it should be understood that the implementations have been presented by way of example and not limitation. The breadth and scope of the present disclosure should not be limited by any of the implementations described above but should be defined in accordance with the following claims, subsequently submitted claims, and their equivalents.

The invention claimed is:

1. A system for concentrating particles in an air stream, said particles comprising airborne suspended PM2.5 aerosol particles, the system comprising: an air channel having a first open end and a second open end, the air channel enclosed by one or more channel walls extending from at least the first open end to the second open end, said air channel further comprising an interior region extending from at least the first open end to the second open end; and at least one stage comprising at least one set of heater elements, said set comprising two heater elements positioned along opposing sides of said channel walls between said first open end and said second open end, said at least one of two heater elements positioned near a periphery of said channel walls of the air channel and configured to force particles in the air stream away from the periphery of said channel walls and towards an interior region of the air channel so that said at least one stage forms a focused beam of said airborne suspended PM2.5 aerosol particles.

2. The system of claim 1, wherein said airborne suspended PM2.5 aerosol particles in the air stream are thermophoretically forced away from said channel walls and towards the interior region of the air channel when said at least one heater elements are heated and thermal gradients emanating from the heater elements are generated.

3. The system of claim 1, wherein said at least one of said two heater elements are positioned along a perimeter of said channel walls in a direction substantially perpendicular to the air stream.

4. The system of claim 3, wherein said at least one heater elements are continuous and extend around said channel walls.

5. The system of claim 1, wherein said at least one of said two heater elements extend along said channel walls in a direction substantially parallel to the air stream.

6. The system of claim 1, wherein said at least one stage further comprises a second stage, said second stage configured to further reconcentrate and refocus said focused beam of said airborne suspended PM2.5 aerosol particles.

7. The system of claim 1, further comprising:
at least one air movement device configured to move air through the air channel.

8. The system of claim 1, further comprising:
at least one MEMS based particle detector coupled to the air channel.

9. The system of claim 8, further comprising at least one precipitating heater configured to deflect at least some particles from said focused beam of said airborne suspended PM2.5 aerosol particles onto said at least one MEMS based particle detector.

10. The system of claim 9, further comprising one or more processor and circuitry for running program code and executing instructions to analyze at least some of those deflected particles.

11. The system of claim 1, further comprising:
a controller comprising one or more processors and program code configured to apply power to said at least one heater elements to allow concentrating said airborne suspended PM2.5 aerosol particles in said interior region of said air stream.

12. A thermophoretic particle concentrator device, comprising: at least one stage comprising at least one set of thermophoretic heater elements, said set of thermophetic heater elements comprising two heater elements positioned near channel walls of an air channel enclosed by said channel walls, at least one of said two thermophoretic heater elements arranged on opposing sides of said channel walls, between a first open end of said air channel and a second open end of said air channel, and configured to thermophoretically force airborne particles comprising airborne suspended PM2.5 aerosol particles in the air channel away from said channel walls and towards an interior region of the air channel so that said at least one stage forms a focused beam of said airborne suspended PM2.5 aerosol particles.

13. The device of claim 12, wherein said at least one stage further comprises a second stage, said second stage configured to further reconcentrate and refocus said focused beam of said airborne suspended PM2.5 aerosol particles.

14. The device of claim 13, further comprising:
at least one precipitating heater configured to deflect at least some particles from said focused beam of said airborne suspended PM2.5 aerosol particles onto at least one MEMS based particle detector; and
one or more processors and circuitry for running program code and executing instructions to analyze at least some of those deflected particles.

15. A method of concentrating particles in an air stream, said particles comprising airborne suspended PM2.5 aerosol particles, the method comprising: applying power to at least one stage comprising at least one set of heater elements, said set or pair comprising two heater elements positioned near a periphery of an air channel enclosed by one or more channel walls extending from at least a first open end to a second open end encompassing at least a portion of the air stream; said at least one of said two heater elements positioned along opposing sides of said channel walls between said first open end and said second open end, and configured so that upon application of power, said at least one heater elements work to form a thermal gradient that forces said airborne suspended PM2.5 aerosol particles in said air stream away from said channel walls and towards an interior region of said air channel; thus forcing particles in the air stream away from the periphery and towards an interior region of the air channel with thermophoretic force generated by said thermal gradient so that said at least one stage forms a focused beam of said airborne suspended PM2.5 aerosol particles.

16. The method of claim 15, further comprising:
using at least one air movement device configured to draw air through the air channel to generate the air stream.

17. The method of claim 15, further comprising:
using at least one MEMS based detector to detect particles concentrated in the air stream.

18. The method of claim 17, further using at least one precipitating heater to deflect at least some particles from said focused beam of said airborne suspended PM2.5 aerosol particles onto said at least one MEMS based particle detector.

19. The method of claim 18, further comprising:
using a controller comprising one or more processors and program code to analyze at least some of those detected particles.

20. The method of claim 16, wherein said at least one stage further comprises a second stage, said second stage configured to further reconcentrate and refocus said focused beam of said airborne suspended PM2.5 aerosol particles.

* * * * *